(12) United States Patent
Yushin et al.

(10) Patent No.: US 11,708,625 B2
(45) Date of Patent: Jul. 25, 2023

(54) METHOD OF SYNTHESIZING A MATERIAL EXHIBITING DESIRED MICROSTRUCTURE CHARACTERISTICS BASED ON CHEMICAL DEALLOYING ONE OR MORE GROUP I OR GROUP II ELEMENTS FROM AN ALLOY AND METHOD OF SYNTHESIZING NANOCOMPOSITES

(71) Applicant: Sila Nanotechnologies, Inc., Alameda, CA (US)

(72) Inventors: Gleb Yushin, Atlanta, GA (US); Kostiantyn Turcheniuk, Atlanta, GA (US); James Benson, Atlanta, GA (US)

(73) Assignees: SILA NANOTECHNOLOGIES, INC., Alameda, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 1394 days.

(21) Appl. No.: 16/052,544

(22) Filed: Aug. 1, 2018

(65) Prior Publication Data
US 2019/0040497 A1 Feb. 7, 2019

Related U.S. Application Data

(60) Provisional application No. 62/540,281, filed on Aug. 2, 2017.

(51) Int. Cl.
*C22C 3/00* (2006.01)
*C22B 5/14* (2006.01)
(Continued)

(52) U.S. Cl.
CPC ............... *C22C 3/005* (2013.01); *C22B 5/14* (2013.01); *B82Y 30/00* (2013.01); *B82Y 40/00* (2013.01)

(58) Field of Classification Search
CPC ...................................... C22C 3/005
See application file for complete search history.

(56) References Cited

U.S. PATENT DOCUMENTS

2015/0318530 A1* 11/2015 Yushin ................. H01M 10/36
429/131

OTHER PUBLICATIONS

Danni Lei Jim Benson Alexandre Magasinski Gene Berdichevsky and Gleb Yushin, Transformation of bulk alloys to oxide nanowires, Science Jan. 20, 2017 vol. 355, Issue 6322 pp. 267-271 (Year: 2017).*

(Continued)

*Primary Examiner* — Christopher S Kessler
(74) *Attorney, Agent, or Firm* — Muncy, Geissler, Olds & Lowe, P.C.; Daniel Podhajny

(57) ABSTRACT

In an embodiment, an alloy is exposed to a hydrophilic solvent at least until at least one Group I or Group II element is substantially removed so as to produce a nanomaterial that substantially includes a metal, semimetal or non-metal material and that exhibits a desired set of microstructure characteristics. The hydrophilic solvent is configured to be reactive with respect to the at least one Group I or Group II element and substantially unreactive with respect to the metal, semimetal or non-metal material. In another embodiment, an active material is infiltrated into pores of a nanoporous metal or metal oxide, after which the infiltrated nanoporous metal or metal oxide material is annealed to produce an active material-based nanocomposite material. A protective coating layer is deposited on at least part of a surface of the active material-based nanocomposite material.

15 Claims, 15 Drawing Sheets
(1 of 15 Drawing Sheet(s) Filed in Color)

102 — EXPOSING AN ALLOY COMPRISING (I) A METAL, SEMIMETAL OR NON-METAL MATERIAL AND (II) AT LEAST ONE GROUP I OR GROUP II ELEMENT TO A HYDROPHILIC SOLVENT AT LEAST UNTIL THE AT LEAST ONE GROUP I OR GROUP II ELEMENT IS SUBSTANTIALLY REMOVED SO AS TO PRODUCE A NANOMATERIAL THAT SUBSTANTIALLY INCLUDES THE METAL, SEMIMETAL OR NON-METAL MATERIAL AND THAT EXHIBITS A DESIRED SET OF MICROSTRUCTURE CHARACTERISTICS, WHEREIN THE HYDROPHILIC SOLVENT IS CONFIGURED TO BE REACTIVE WITH RESPECT TO THE AT LEAST ONE GROUP I OR GROUP II ELEMENT AND SUBSTANTIALLY UNREACTIVE WITH RESPECT TO THE METAL, SEMIMETAL OR NON-METAL MATERIAL

(51) Int. Cl.
    *B82Y 30/00* (2011.01)
    *B82Y 40/00* (2011.01)

(56) References Cited

OTHER PUBLICATIONS

Changchun Zhao, Zhen Qi, Xiaoguang Wang, and Zhonghua Zhang, Fabrication and characterization of monolithic nanoporous copper through chemical dealloying of Mg—Cu alloys, Corrosion Science vol. 51, Issue 9, Sep. 2009, pp. 2120-2125 (Year: 2009).*

Chen, Lu-Yang, et al. "Nanoporous copper with tunable nanoporosity for SERS applications." Advanced Functional Materials 19.8 (2009): 1221-1226. (Year: 2009).*

* cited by examiner

102 — EXPOSING AN ALLOY COMPRISING (I) A METAL, SEMIMETAL OR NON-METAL MATERIAL AND (II) AT LEAST ONE GROUP I OR GROUP II ELEMENT TO A HYDROPHILIC SOLVENT AT LEAST UNTIL THE AT LEAST ONE GROUP I OR GROUP II ELEMENT IS SUBSTANTIALLY REMOVED SO AS TO PRODUCE A NANOMATERIAL THAT SUBSTANTIALLY INCLUDES THE METAL, SEMIMETAL OR NON-METAL MATERIAL AND THAT EXHIBITS A DESIRED SET OF MICROSTRUCTURE CHARACTERISTICS,
WHEREIN THE HYDROPHILIC SOLVENT IS CONFIGURED TO BE REACTIVE WITH RESPECT TO THE AT LEAST ONE GROUP I OR GROUP II ELEMENT AND SUBSTANTIALLY UNREACTIVE WITH RESPECT TO THE METAL, SEMIMETAL OR NON-METAL MATERIAL

*FIG. 1*

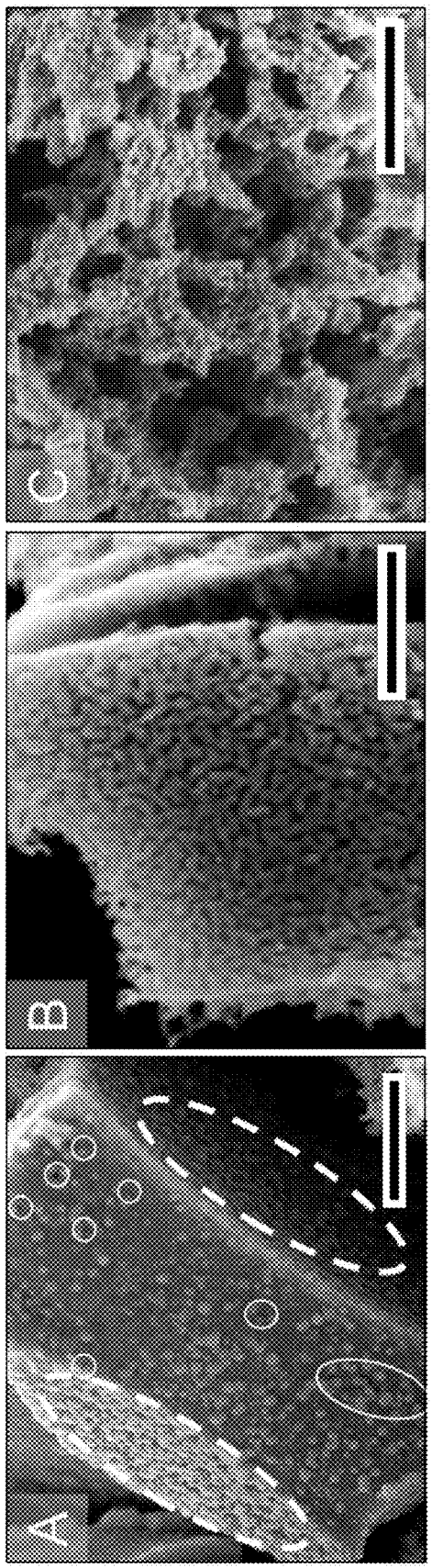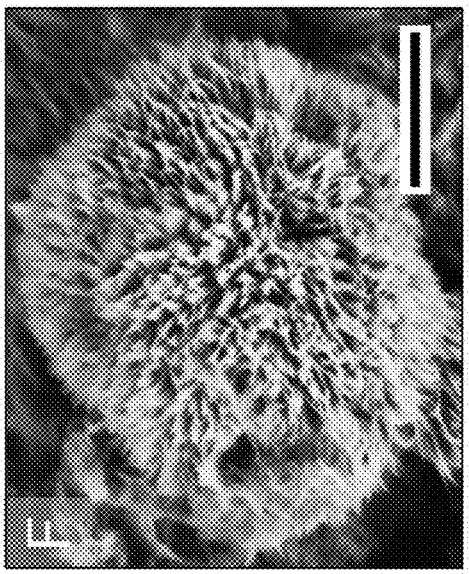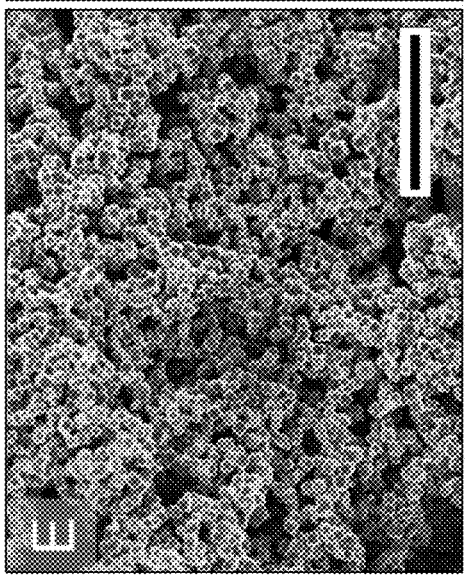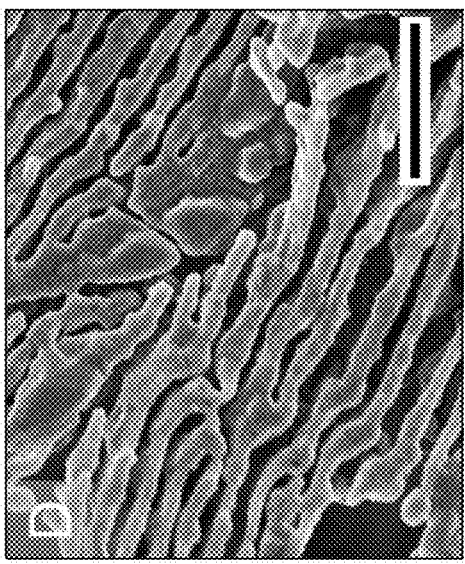
FIG. 1A  FIG. 1B  FIG. 1C  FIG. 1D  FIG. 1E  FIG. 1F

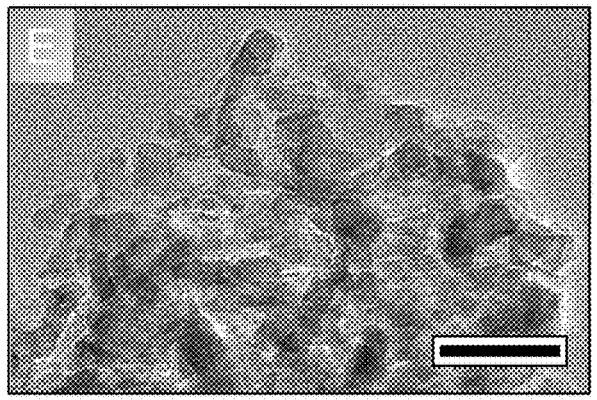 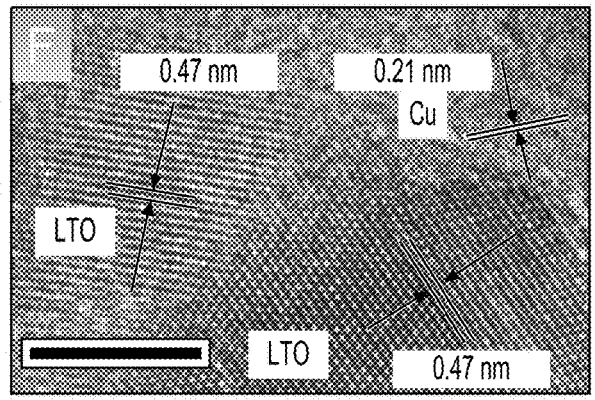
FIG. 5E  FIG. 5F
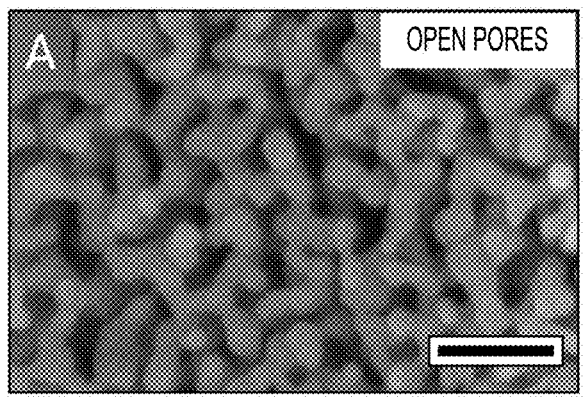 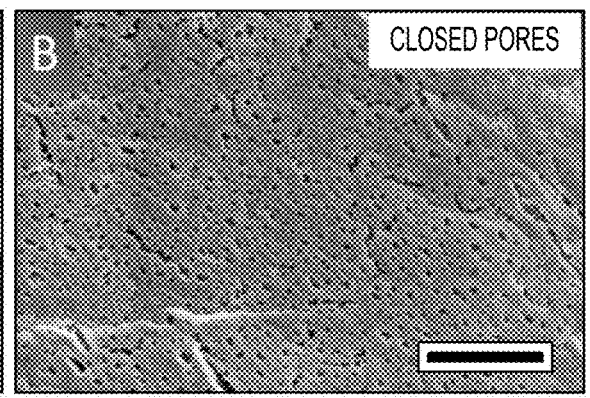
FIG. 6A  FIG. 6B

METHOD OF SYNTHESIZING A MATERIAL EXHIBITING DESIRED MICROSTRUCTURE CHARACTERISTICS BASED ON CHEMICAL DEALLOYING ONE OR MORE GROUP I OR GROUP II ELEMENTS FROM AN ALLOY AND METHOD OF SYNTHESIZING NANOCOMPOSITES

CLAIM OF PRIORITY UNDER 35 U.S.C. § 119

The present application for patent claims the benefit of U.S. Provisional Application No. 62/540,281, entitled "Nanoporous Metal Synthesis for Energy Storage and Other Applications," filed Aug. 2, 2017, which is expressly incorporated herein by reference in its entirety.

BACKGROUND

Field

The present disclosure relates generally to nanomaterials, and more particularly to a method of synthesizing a material exhibiting desired microstructure characteristics based on chemical dealloying one or more Group I or Group II elements from an alloy and a method of synthesizing nanocomposites.

Background

In recent years, there has been a large interest in the implementation of nanomaterials in various electronic, chemical and biological processes. Attention has been focused on the ability of structural characteristics of nanomaterials to influence chemical or biological systems, since the dimensions of the materials and high surface-to-volume ratios can strongly affect their behavior. A well-known example is gold (Au) nanoparticles, which have different colors depending on their aspect ratio. Nanostructured materials prepared from noble metals, such as copper (Cu) or platinum (Pt), possess unique characteristics, which increase their viability in biomedical, catalytic, energy storage and electronic applications. Due to its natural abundance, relatively low cost, high electrical conductivity, and stability in contact with lithium (Li), Cu has been used as a current collector in modern batteries, including Li-ion cells. The antibacterial properties of various metals (including Cu) have also been intensively studied, showing the potential of Cu in medicine due to the active surface and the variety of oxidation states. Porous Cu has been found suitable for electrocatalysis and non-enzymatic biosensing, drinking water treatment and as bipolar plates in fuel cells. Cu-based organometallic compounds are also in high demand for catalytic applications and have found use in highly stereoselective reactions and Cu-catalyzed "click" reactions. Due to the high thermal conductivity of Cu, porous Cu has been successfully used in a broad range of heat-exchangers. Nanoporous Cu has also been successfully used in various interconnections (e.g., chip-to-substrate, among others) that may be bonded at low temperatures as well as in various functional membranes.

In spite of multiple methods known to synthesize Cu nanomaterials, there are still many challenges associated with the intrinsic tendency of Cu to oxidize and form copper oxides ($Cu_2O$ and $CuO$), which limit the activity of metallic Cu. In addition, the synthesis of Cu nanomaterials and porous Cu often relies on the use of highly corrosive chemicals or complex (e.g., expensive) organic molecules. For example, to produce ultra-long Cu nanowires from copper (II) nitrate, researchers have used sodium hydroxide, hydrazine, and ethylenediamine at elevated temperatures (up to 100° C.). Synthesis of Cu nanowires from oleylamine and copper (I) chloride, which represents a general seed-mediated approach for nanowire growth, requires the use of high temperatures and a toxic capping reagent. The use of anodic aluminum oxide membranes as a sacrificial template in the electrodeless deposition process of Cu nanowires is well-controllable, but is slow and too expensive for most applications. In addition to solution methods, other sophisticated methods of fabrication of Cu nanostructures, such as nanosphere lithography, have been used with some degree of success, but tend to suffer from very high equipment and processing costs (on a cost/kg basis).

The utilization of metallic Cu may simplify the synthetic routes to Cu nanoparticles and porous Cu. Indeed, several Cu-based alloys, such as brass (Cu and Zn) and bronze (Cu and Sn) have been used to synthesize Cu nanoparticles. Conventionally, dealloying is used to etch the less noble metal from the Cu alloy and requires corrosive chemicals and often application of an external oxidizing potential. For example, nanoporous Cu(NPCu) can be produced from Cu—Mg alloys in a 0.2 M NaCl aqueous solution at the potential of −0.3 V vs. Ag/AgCl. Interestingly, the dissolution of Cu to form a soluble $CuCl_2^-$ complex also contributed to the dealloying of Cu—Mg alloys and the formation of NPCu (although at the expense of lower Cu utilization). $Cu_2O$/NPCu composites have been prepared by etching a $Cu_{50}Al_{50}$ wt. % alloy in NaOH at 60° C. for several days followed by subsequent in situ thermal oxidation. $Cu_{30}Mn_{70}$ or $Cu_{50}Mn_{50}$ alloys in an acidic aqueous solution or at 0 V voltage for 20 h in 0.5 M NaCl solution, respectively, have been used to etch Mn. $Cu_{39}Mn_{54}O_7$ ingots have been treated in 0.05M HCl for 1, 2, and 26 days with and without oxygen to yield copper dendrites of copper sponge.

Undoubtedly, NPCu exhibits notable characteristics, which are not typically found in more commonly used carbon nanomaterials and which may be highly attractive for some applications in energy storage, for example. As used herein, the prefix "nano" may refer to the length scale of a ligament-channel structure, not necessarily to the International Union of Pure and Applied Chemistry (IUPAC) classification of porosity (i.e., microporous). For example, NPCu and other nanoporous precious metals possess an easily adjusted bi-continuous structure with open porosity and may be advantageous in certain applications to facilitate rapid ion transport and better solvent flow. NPCu and other nanoporous precious metals also possess well-defined surface chemistry and superior electrical conductivity (e.g., more than 1000 times higher than that of carbon). The macrostructure and flexibility of NPCu and other nanoporous precious metals allow for mechanical integration with the structural elements of batteries, without the use of binders, thus reducing the volume of the electrode and increasing its energy density. Unfortunately, the currently known methods for nanostructured Cu synthesis suffer from the need to use elaborate procedures, sophisticated equipment, expensive templates, highly corrosive or dangerous chemicals, and result in harmful waste products and often slow synthesis rates, which makes nanostructured Cu synthesis techniques unsuitable for some applications.

In addition to challenges in synthesis of nanostructured or nanoporous Cu, formation of various nanostructured or nanoporous Cu salts (including CuO, CuS, $CuF_2$, among others) remains difficult, expensive and not environmentally friendly. Furthermore, nanostructured or nanoporous forms of many other metals and their salts are similarly difficult to produce.

Accordingly, there remains a need for improved nanostructured metal (e.g., Cu) and metal salt (e.g., CuO, CuS, $CuF_2$, etc.) synthesis and the like for various applications, components, and other related materials and manufacturing processes.

SUMMARY

Embodiments disclosed herein address the above stated needs by providing improved batteries, components, and other related materials and manufacturing processes.

As an example, an embodiment is directed to a method of synthesizing a nanomaterial, comprising exposing an alloy comprising (i) a metal, semimetal or non-metal material and (ii) at least one Group I or Group II element to a hydrophilic solvent at least until the at least one Group I or Group II element is substantially removed so as to produce the nanomaterial that substantially includes the metal, semimetal or non-metal material and that exhibits a desired set of microstructure characteristics, wherein the hydrophilic solvent is configured to be reactive with respect to the at least one Group I or Group II element and substantially unreactive with respect to the metal, semimetal or non-metal material.

As another example, an embodiment is directed to a method of synthesizing an active material-based nanocomposite material, comprising infiltrating an active material into pores of a nanoporous metal or metal oxide material via solution-based deposition, vapor-based deposition, or by producing the active material by at least partially converting a surface of the pores via treatment in chemically active gaseous media at a temperature range from about 0° C. to about 700° C., annealing the infiltrated nanoporous metal or metal oxide material to produce the active material-based nanocomposite material, and depositing a protective coating layer on at least part of a surface of the active material-based nanocomposite material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are presented to aid in the description of embodiments of the invention and are provided solely for illustration of the embodiments and not limitation thereof.

FIG. 1 illustrates a process of synthesizing a nanostructure in accordance with an aspect of the disclosure.

FIGS. 1A-1F illustrate example nanostructures obtained by aqueous CuCa dealloying under different process conditions, including: Ar/water, pH 7, room temperature, 30 min, scale bar 500 nm (FIG. 1A); Ar/water, pH 7, room temperature, 12 h, scale bar 250 nm (FIG. 1B); Ar/water, pH 7, room temperature, 72 h, scale bar 500 nm (FIG. 1C); Ar/water, pH 1, room temperature, 12 h, scale bar 1 μm (FIG. 1D); Ar/water/PEG, pH 7, room temperature, 72 h, scale bar 3 μm (FIG. 1E); and $O_2$/water, pH 7, room temperature, 12 h, scale bar 2 μm (FIG. 1F).

FIG. 3A shows a statistical model to be highly predictive with an R-squared value of 0.98, root mean squared error (RMSE) of 2.212, and a statistically significant whole model p-value as shown in the actual by predicted plot. FIG. 3B shows the effect different factors have on observed ligament size, the range of ligament lengths is observed to vary from 15 to 35 depending on the synthesis conditions.

FIGS. 5A-5F illustrate: SEM micrograph of NPCu (scale bar 200 nm) (FIG. 5A); SEM micrograph of NPCu-LTO (scale bar 50 nm) (FIG. 5B); EDS analysis of NPCu-LTO (FIG. 5C); BET adsorption isotherm of NPCu (FIG. 5D); TEM micrograph of NPCu-LTO (scale bar 50 nm) (FIG. 5E); and HRTEM micrograph of NPCu-LTO (scale bar 10 nm) (FIG. 5F).

FIGS. 6A-6B illustrate: NPCu before LTO precursor infiltration, scale bar 200 nm (FIG. 6A); and NPCu after excessive LTO precursor infiltration and drying at 60° C., scale bar 500 nm (FIG. 6B).

DETAILED DESCRIPTION

Figure 2A:
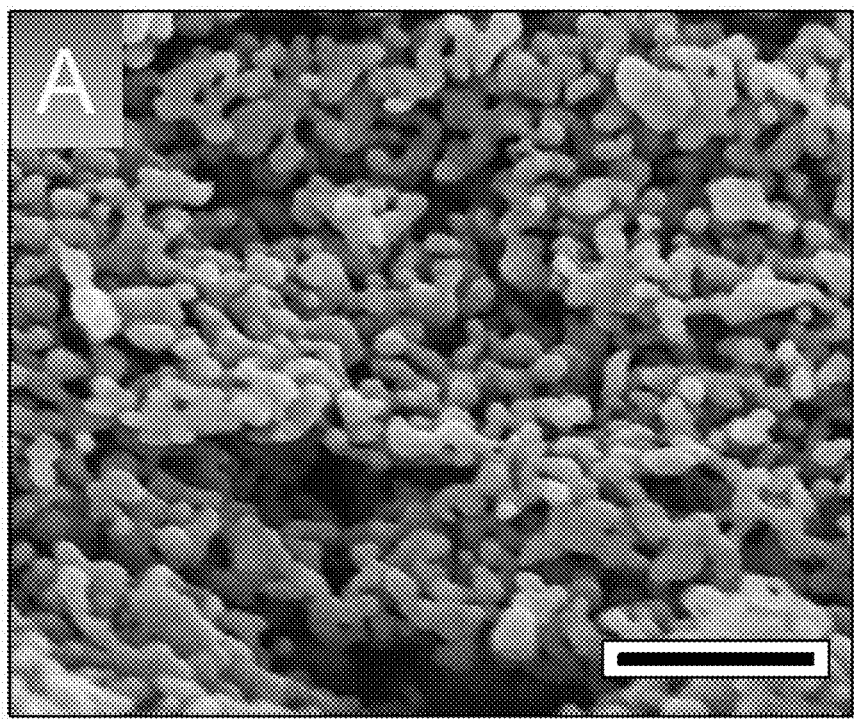
FIGS. 2A-2B illustrate dealloying of an example $CuCa_2$ alloy, including: NPCu obtained by $CuCa_2$ dealloying in Ar/water, pH 7, room temperature, 12 h, scale bar 200 nm (FIG. 2A); nanostructures obtained by $CuCa_2$ dealloying in Ar/water, pH 1, room temperature, 12 h (FIG. 2B).

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, it will be appreciated that certain synthesis processes or steps may be applied in whole or in part to the production of various materials.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. While the description below may describe certain examples in the context of porous or nanostructured copper (Cu) formation and porous or nanostructured copper oxide (CuO) formation (for brevity and convenience), it will be appreciated that various aspects may be applicable to the formation of other porous or nanostructured metals, metal oxides and other metal salts (sulfides, fluorides, etc.). Examples of such metals and metal salts include but are not limited to the following metals: various noble metals and their oxides and salts (such as Au, Ag, Pt, etc.), various semimetals and their oxides and salts (such as Si, Ge, Sb, Te, etc.), various transition metals and their oxides and salts (such as Mn, Cr, Fe, Co, Ni, Zn, Sc, Y, Zr, Nb, Ru, etc.), various post-transition metals and their oxides and salts (such as Al, Ga, In, Sn, Tl, etc.), various alkali earth metals and their oxides and salts (such as Mg, Be, Sr, Ba, etc.).

While the description below may describe certain examples in the context of formation of porous or nanostructured structures of a single metal or metal oxide or metal salt, it will be appreciated that various aspects may be applicable to the formation of porous or nanostructured structures of metal alloys that comprise two, three or more metals or porous or nanostructured structures of metal-metal oxide mixtures (that comprise one, two, three or more metals) or porous or nanostructured structures of oxides of metal alloys that comprise two, three or more metals or porous or nanostructured structures of other salts of metal alloys that comprise two, three or more metals.

While the description below may describe certain examples of the formation of calcium (Ca) alloys with the atomic fraction of Ca in the range from around 33% to around 67%, it will be appreciated that both lower and higher atomic fraction of Ca may be suitable in some designs and experimental conditions for the formation of porous or nanostructured metal-containing structures. For example, at. % Ca in the range from around 5% to around 90% may be suitable. In an example, the above-noted atomic fractions refer to the Ca alloy composition before being exposed to a hydrophilic solvent (e.g., as discussed below in more detail with respect to 502 of FIG. 5), and these atomic fractions are reduced over time upon being exposed to the hydrophilic solvent.

While the description below may describe certain examples in the context of Ca alloys, it will be appreciated that various aspects may be applicable to the alloys of other Group II (alkaline earth) elements, such as Be, Mg, Sr, Ba and Ra.

While the description below may describe certain examples in the context of alloys of alkaline earth elements, it will be appreciated that various aspects may be applicable to the alloys of Group I elements (alkali metals), such as H, Li, K, Rb, Cs and Fr.

While the description below may describe certain examples in the context of treatment (chemical dealloying) of alloys in pH-neutral aqueous solutions, it will be appreciated that various aspects may be applicable to basic or acidic aqueous solutions.

While the description below may describe certain examples in the context of treatment (chemical dealloying) of alloys in pure aqueous solutions, it will be appreciated that various aspects may be applicable to aqueous solutions additionally comprising surfactants or organic solvents or ionic liquids or organic or inorganic salts or their various combinations.

While the description below may describe certain examples in the context of treatment (chemical dealloying) of alloys at atmospheric pressures, it will be appreciated that various aspects may be applicable to treatment under elevated pressures (e.g., 1-10,000 atm.) or under reduced pressures (e.g., 0.000001-0.99 atm).

While the description below may describe certain examples in the context of treatment (chemical dealloying) of alloys at near room temperatures, it will be appreciated that various aspects may be applicable to treatment at elevated temperatures (e.g., within a broad temperature range of around +100° C. to around +1,000° C.) or at low temperatures (e.g., within around (minus) −270° C. to around +10° C.), depending on the solvent used, pressure and a particular alloy chemistry.

While the description below may describe certain examples in the context of treatment (chemical dealloying) of alloys in a catalyst-free environment, it will be appreciated that various aspects may be applicable to treatments in the presence of catalysts, including but not limited to Group III-XII elements: various noble metals (such as Cu, Ag, Au, Rh, Pd, Pt, Ru, Os, etc.), various transition metals (such as Fe, Co, Ni, Cr, Mn, V, Ti, Nb, Ta, etc.) or their derivatives (such as metal organic, and organometallic complexes of various coordination states as well as metal halides), including their nanostructures and nanoscale assemblies, such as metal-organic frameworks (MOFs) and covalent organic frameworks (COFs).

While the description below may describe certain examples in the context of treatment (chemical dealloying) of alloys in the absence of free radical initiators, it will be appreciated that various aspects may be applicable to treatments in the presence of free radical initiators. Suitable examples of such initiators may include but not limited to organic free radical initiators (such as (2,2,6,6-Tetramethylpiperidin-1-yl)oxyl or (2,2,6,6-tetramethylpiperidin-1-yl)oxidanyl (TEMPO), benzoyl peroxide, and azobisisobutyronitrile (AIBN), among others), and inorganic free radical initiators (such as iodine, potassium persulfate, among others).

While the description below may describe certain examples in the context of treatment (chemical dealloying) of alloys in water or in aqueous solutions, it will be appreciated that various aspects may be applicable to treatments in solutions of non-aqueous inorganic solvents, including but not limited to eutectic salt melts (binary and ternary alkali metal halide salts, or a mixture of alkaline or alkaline earth metal halide and Group II-XV any metal or semimetal halides, sulfates, nitrides, nitrites, phosphates, carbonates, borates, tetrafluoroborates, etc.), liquid ammonia, anhydrous amines, anhydrous basic solvents, aqueous and nonaqueous hydrogen fluoride, bromine trifluoride, dinitrogen tetroxide, phosphorus oxychloride, phosphorus (III) and (V) chlorides, sulfonyl chloride, sulfuryl chloride, carbon tetrachloride, various other fused salts (e.g., chlorides, fluorides and other halides, metal amines, etc.) and oxides, sulfuric acid, acetic acid, noble gases (such as xenon), and molecular gases (such as sulfur hexafluoride, tungsten hexafluoride, sulfur dioxide, etc.).

While the description below may describe certain examples in the context of treatment (chemical dealloying) of alloys in water or in aqueous solutions, it will be appreciated that various aspects may be applicable to treatments in mixtures of water and organic solvents or pure organic solvents or their various mixtures, including but not limited to butanol, ether, dichloromethane, carbon disulphide, glycerol, acetone, carbon tetrachloride, cyclohexane, formic acid, toluene, anisole, pyridine, acetic acid, hexane, xylene, trifluoroacetic acid, dimethyl sulfoxide, benzene, nitrobenzene, dimethylformamide, cyclohexane, tetrahydrofuran, acetonitrile, ethanol, methanol, chloroform, iso-propanol and other alcohols, among others.

While the description below may describe certain examples in the context of treatment (chemical dealloying) of alloys in aqueous solutions and conventional organic solvent, it will be appreciated that various aspects may be applicable to treatments in ionic liquids and ionic liquid-comprising solutions. Examples of suitable ionic liquid include, but are not limited to those that comprise common cations, such as 1-alkyl-3-methylimidazolium, 1-alkylpyridinium, 1-alkyl-2,3-dimethylimidazolium, 1-alkyl-1-methylpyrrolidinium, 1-alkyl-1-methylpipperidinium, tetraalkylphosphonium, tetraalkylammonium, trialkylsulphonium in which alkyl is methyl, ethyl, 1-propyl, 2-propyl, 1-butyl, 2-butyl, and higher homologues, in a combination with any of these (but not limited to) common anions, such as $PF_6^-$, $N(SO_2CF_3)_2^-$, $BR_1R_2R_3R_4$ (where $R_1$, $R_2$, $R_3$, $R_4$ is alkyl, aryl, trifluoroalkyl, trifluoroaryl, etc.), $BF_4^-$, $CF_3SO_2^-$, $CH_3CO_2^-$, $CF_3SO_2^-$, $NO_3$, $Cl^-$.

While the description below may describe certain examples in the context of treatment (chemical dealloying) of alloys in solutions, it will be appreciated that various aspects may be applicable to treatments (chemical de-alloying) in gaseous environments (e.g., in a vapor or in a gas) or in a combination of treatments in liquid and gaseous environments (e.g., when the sample treated in a gaseous environment is then exposed to a liquid to dissolve the reacted spices).

While the description below may describe certain examples of the formation of functional nanocomposites in the context of deposition of lithium titanium oxide (lithium titanate, LTO), it will be appreciated that other metal oxides (comprising one, two, three or more metals) as well as metal sulfides and metal fluorides could be deposited (or produced) on the surface of nanostructured or porous metals (produced according to this description) for superior performance in various applications.

While the description below may describe certain examples of the formation of functional nanocomposites in the context of deposition of Li intercalation-type LTO on the surface of nanostructured or porous metals (produced according to this description) for using in Li-ion batteries or supercapacitors or hybrid devices, it will be appreciated that other intercalation-type compounds suitable for Li-ion storage could be similarly utilized (e.g., lithium cobalt oxide ($LiCoO_2$, or LCO, or $LiCo_2O_4$), lithium nickel oxide ($LiNiO_2$, or LNO), lithium manganese oxide ($LiMnO_2$ or LMO, or $Li_2MnO_3$, or $LiMn_2O_4$), lithium nickel cobalt aluminum oxide ($LiNi_{0.8}Co_{0.15}Al_{0.05}O_2$, or $LiNi_xCo_yAl_zO_2$, where x+y+z=1, or NCA), lithium nickel manganese oxide ($LiNi_{0.5}Mn_{0.5}O_2$, or NMO), lithium nickel cobalt manganese oxide ($LiNi_{0.33}Co_{0.33}Mn_{0.33}O_2$, or $LiNi_xCo_yMn_zO_2$, where x+y+z=1, or NCM, or NMC), or lithium titanium sulfite ($LiTiS_2$), or lithium iron phosphate ($LiFePO_4$, LFP), or lithium manganese phosphate ($LiMnPO_4$), lithium cobalt phosphate ($LiCoPO_4$), lithium nickel phosphate, lithium vanadium fluoro phosphate ($LiVFPO_4$), lithium iron fluoro sulfate ($LiFeSO_4F$), or any other type of Li-containing layered, tavorite, olivine, or spinel type active cathode materials or their mixtures thereof.

While the description below may describe certain examples of the formation of functional nanocomposites in the context of deposition of intercalation-type active materials on the surface of nanostructured or porous metals (produced according to this description) for using in Li-ion batteries or supercapacitors or hybrid devices, it will be appreciated that so-called alloying-type active materials or so-called conversion-type active materials could be advantageously deposited and used in some designs in batteries, supercapacitors or hybrid devices.

Conversion-type cathode materials for rechargeable Li-ion or Li batteries may offer higher energy density, higher specific energy, or higher specific or volumetric capacities compared to intercalation-type cathode materials. For example, fluoride-based cathodes may offer outstanding technological potential due to their very high capacities, in some cases exceeding 300 mAh/g (greater than 1200 mAh/$cm^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). In a fully lithiated state, metal fluorides covert to a composite comprising a mixture of metal and LiF clusters (or nanoparticles). Examples of the overall reversible reactions of the conversion-type metal fluoride cathodes may include $2Li+CuF_2 \leftrightarrow 2LiF+Cu$ for $CuF_2$-based cathodes or $3Li+FeF_3 \leftrightarrow 3LiF+Fe$ for $FeF_3$-based cathodes). It will be appreciated that metal fluoride-based cathode materials may be prepared in both Li-free or partially lithiated or fully lithiated states. It will be appreciated that metal fluoride-based cathode active materials may also comprise oxygen (e.g., 0.1-25 at. %). The nanostructured or porous metal substrate may enhance stability and electrical conductivity to fluoride-based cathode active materials. Another example of a promising conversion-type cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of $S/Li_2S$ electrodes, one may advantageously utilize porous S, $Li_2S$, porous S—C (nano)composites, $Li_2S$—C(nano)composites, $Li_2S$-metal oxide (nano)composites, $Li_2S$—C-metal oxide (nano)composites, $Li_2S$—C-metal sulfide (nano)composites, $Li_2S$-metal sulfide (nano)composites, $Li_2S$—C-mixed metal oxide (nano)composites, $Li_2S$—C-mixed metal sulfide (nano)composites, porous S-polymer (nano)composites, or other composites or (nano)composites comprising S or $Li_2S$, or both. In some designs, such (nano)composites may advantageously comprise conductive carbon. In some designs, such (nano)composites may advantageously comprise metal oxides or mixed metal oxides. In some designs, such (nano)composites may advantageously comprise metal sulfides or mixed metal sulfides. In some examples, mixed metal oxides or mixed metal sulfides may comprise lithium metal. In some examples, mixed metal oxides may comprise titanium or vanadium metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive. In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within 1.5-3.8 V vs. $Li/Li^+$). Formation of functional composites comprising conversion-type active materials (according to this description) may, at least partially, overcome various limitations. For example, they may offer reduced voltage hysteresis, improved capacity utilization, improved rate performance, improved mechanical and sometimes improved electrochemical stability, reduced volume changes, and/or other positive attributes.

Alloying-type anode materials for use in Li-ion batteries offer higher gravimetric and volumetric capacities compared to intercalation-type anodes (such as graphite or LTO). For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si—C composites, Si-metal composites, Si-ceramic composites, or other types of porous composites comprising nanostructured Si or nanostructured or nano-sized Si) may reduce volume changes during Li-ion insertion and extraction, which, in turn, may lead to better cycle stability in rechargeable Li-ion cells. In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others. In addition to (nano)composite anodes comprising alloying-type active materials, other interesting types of high capacity (nano)composite anodes may comprise metal oxides (including silicon oxide, lithium oxide, etc.), metal nitrides, metal phosphides (including lithium phosphide), metal hydrides, and others. It will be appreciated that alloying-type active anode materials may be prepared in both Li-free or partially lithiated or fully lithiated states.

In some designs, the produced porous or nanostructured metal or other structures may be advantageously used in metal (e.g., lithium metal) batteries (e.g., as porous current collectors on the anode or cathode side).

While the description below may describe certain examples of the formation of functional nanocomposites for energy storage devices with a liquid electrolyte, it will be appreciated that solid electrolytes (e.g., polymer gel electrolyte, solid polymer electrolytes, ceramic electrolytes, mixed salt electrolytes, etc.) as well as hybrid electrolytes (comprising both liquid and solid components) may be advantageously utilized in some designs.

While the description below may describe certain examples of the formation of functional nanocomposites in the context of deposition of Li-containing or Li-storing electrochemically active (Li ion-storing) materials on the surface of nanostructured or porous metals (produced according to this description) for using in Li-ion batteries or supercapacitors or hybrid devices, it will be appreciated that active materials suitable for other non-Li battery chemistries (e.g., Na-ion, K-ion, Ca-ion, OH-ion, mixed ions, etc.) could be advantageously used in some designs.

While the description below may describe certain examples of the formation of functional nanocomposites in the context of deposition of continuous or semi-continuous films of functional (e.g., active in reactions) materials on the surface of nanostructured or porous metals or metal oxides (produced according to this description), it will be appreciated that such materials may be deposited in the form of discrete particles of various size (e.g., in the range from around 1 nm to around 100 nm), may exhibit core-shell structures, may be deposited in the form of thin films (e.g., amorphous or nanocrystalline or mixed with the grain size in the range from around 1 nm to around 100 nm and with the thickness size in the range from round 1 nm to around 500 nm) or both and may comprise multiple layers (e.g., more than one structurally or compositionally distinct layer of thin films or particles or both).

While the description below may describe certain examples of the formation of functional nanocomposites in the context of deposition of functional (e.g., active in reactions) materials on the surface of nanostructured or porous metals or metal oxides (produced according to this description) solutions, it will be appreciated that in some designs the deposition may be conducted in a gaseous environment (e.g., using chemical vapor deposition (CVD), atomic layer deposition (ALD), physical vapor deposition (PLD) and other suitable processes) or in both (solution+gas phase depositions). Suitable temperatures for deposition may depend on a particular chemistry, but it is typically in the range from around 10° C. to around 800° C. Suitable pressure for deposition may depend on a particular chemistry, but it is typically in the range from around 0.00001 atm to around 100 atm. In some designs, it may be advantageous to utilize near atmospheric pressures. In some designs, composite materials may be heat-treated in an inert environment (e.g., at temperature from around 100° C. to around 800° C.) for improved performance. In some designs, active materials (or thus produced composite materials) may be additionally coated with a protective surface layer (e.g., to prevent undesirable reactions with electrolyte or ambient environment during device assembling, etc.). The suitable thickness of the protective surface layer may vary depending on the particular chemistry of the active material and the cell electrochemistry, but typically in the range from around 0.3 nm to around 100 nm. Such a protective coating surface layer may be deposited by ALD, CVD or other types of vapor deposition, by electrophoretic deposition, by electrodeposition, by electroless deposition, by sol-gel, by layer-by-layer deposition and other types of solution-based depositions or by using a combination of deposition methods.

While the description below may describe certain examples of the formation of functional nanocomposites in the context of deposition of functional (e.g., active in reactions) materials on the surface of nanostructured or porous metals or metal oxides (produced according to this description), it will be appreciated that in some designs the active material may be produced by exposing the nanostructured or porous metals or metal oxides to a chemically active gaseous environment. In one illustrative example, by exposing nanostructured or porous Cu or CuO to F-containing gaseous environment (e.g., ammonium fluoride or nitrogen fluoride), one may produce the $CuF_2$ (e.g., as a part of the composite or completely convert the material into $CuF_2$). The suitable temperature may vary depending on the composition of the initial and final (active material), but is typically in the range from around 0° C. to around 1000° C. In another illustrative example, by exposing nanostructured or porous Fe or Cu—Fe composite or $Fe_2O_3$ or $Fe_3O_4$ or CuO—$Fe_2O_3$ or Cu—$Fe_2O_3$ or CuO—$Fe_3O_4$ or CuO—$Fe_3O_4$ composite to a chemically reactive F-containing gaseous environment (e.g., ammonium fluoride or nitrogen fluoride), one may produce the $FeF_3$—$CuF_2$ composite. The exposure may be preceded by the conformal deposition of a surface layer (e.g., carbon or another oxide or another metal). Such a composite may, as an illustrative example, be further chemically lithiated to produce Fe—Cu—LiF comprising composite.

While the description below may describe certain examples in the context of formation of porous or nanostructured structures of metal or metal oxides in a powder morphology (e.g., with the particle size in the range from around tens of nanometers to around a mm), it will be appreciated that various aspects may be applicable to the formation of larger (e.g., 0.1-10 mm) or smaller (e.g., 1-10 nm) particles of various morphology and aspect ratio as well as for the formation of continuous or discontinuous films (e.g., with a film thickness in the range from around 50 nm to around 10 mm and with the film area in the range from around 0.0000001 $mm^2$ to around 100 $m^2$). Such films may be free-standing or be deposited on substrates.

While the description below may describe certain examples of the formation of functional nanocomposites for use in energy storage applications, it will be appreciated that various aspects may be applicable to advantageous use of the produced nanostructured or porous materials and composites in such applications as sensors (e.g., electrochemical sensors, dielectric sensors for humidity and species other than water, etc.), gas purification, water (or other solvent) purification, selective sorption, gas storage, protein sorption, catalyst and catalyst support, chromatography, imaging, heat exchangers, interconnects, energy damping structures/supports, lighter-weight structural materials, drug delivery, implantable interconnects, scaffolds for tissue regeneration, scaffolds for assisting reconstruction of the nervous systems, antibacterial coatings and masks, adjuvants (for vaccines), among others.

FIG. 1 illustrates a process of synthesizing a nanostructure in accordance with an aspect of the disclosure. At block 102, an alloy (e.g., CuCa, $CuCa_2$, etc.) comprising (i) a metal, semimetal or non-metal material (e.g., Cu, etc.) and (ii) at least one Group I or Group II element (e.g., Ca, Be, Mg, Sr, Ba, Ra, H, Li, K, Rb, Cs, Fr, etc.) is exposed to a hydrophilic solvent at least until the at least one Group I or Group II element is substantially removed (e.g., by chemical dealloying) so as to produce a nanostructure that substantially includes the metal, semimetal or non-metal material and that exhibits a desired set of microstructure characteristics. In an example, the hydrophilic solvent is configured to be reactive with respect to the at least one Group I or Group II element and substantially unreactive with respect to the metal, semimetal or non-metal material.

Referring to FIG. 1, in an embodiment, one or more desired microstructure characteristics are selected from among a plurality of possible microstructure characteristics for nanostructure materials that include the metal, semimetal or non-metal material. One or more parameters are then determined as being capable of causing the nanostructure material to exhibit the one or more desired microstructure characteristics if used in association with the exposing of block 102. Thereby, the exposing of block 102 may be performed in accordance with the one or more determined parameters to produce the nanostructure with the selected one or more desired microstructure characteristics. In an example, the one or more determined parameters may include pH, temperature, pressure, a composition of the hydrophilic solvent, and a time of exposure of the alloy to the hydrophilic solvent. In an example, the alloy may be ground to a powder before the exposing of block 102.

Referring to FIG. 1, as will be described below in more detail, different microstructure characteristics and/or combinations of microstructure characteristics for the nanostructure can be achieved by varying the above-noted exposure parameters. These microstructure characteristics may include the presence of nanopores, nanoflowers, nanoflakes, dentrites, nanowires, nanofibers, nanowhiskers, nanostrips, nanotubes and/or microparticles, microstructures having needle-liked shapes or rod-like shapes, or any combination thereof.

Referring to FIG. 1, the hydrophilic solvent may be non-corrosive or environmentally friendly, and may include water, methanol, ethanol, hydrochloric acid (HCl), polyethylene glycol or a combination thereof. In an example, the hydrophilic solvent may comprise a surfactant. In an example, some or all of the chemically dealloyed calcium is reconstituted as part of a material (e.g., $Ca(OH)_2$) that is soluble in the hydrophilic solvent, whereby the nanomaterial itself is insoluble in the hydrophilic solvent. In this case, the nanomaterial can be extracted by separating the hydrophilic solvent (including the soluble material) from the nanomaterial via a process such as decanting. In an example, part of the chemically dealloyed calcium may be reconstituted as part of a material (e.g., $CaCO_3$) that is insoluble in the hydrophilic solvent, in which case the insoluble calcium material may be quenched (e.g., with HCl).

While the description below discusses (by way of example) synthesis and applications of Cu nanostructures and nanomaterials (including but not limited to (nano) porous Cu), various useful nanostructures of other metals, semimetals, metal alloys, metal (or semimetal) oxides, metal (or semimetal) hydroxides, metal (or semimetal) alkoxides and other metal-comprising nanostructures may also be produced using a similar methodology, where an intermediate alloy of metal(s) (or semimetal(s)) of interest and more reactive metal(s) (e.g., more reactive alkaline earth or alkali metals) are first formed and the dissolution of the latter leads to the formation of desirable metal (or metal oxide or metal hydroxide or metal alkoxide, etc.) nanostructures. Examples of suitable metals and semimetals include but are not limited to Cu, Ag, Au, Ti, V, Cr, Mn, Fe, Co, Ni, Y, Zr, Nb, Mo, Ru, Rh, Pd, Hf, Ta, W, Re, Os, Ir, Pt, Al, Zn, Ga, Cd, In, Sn, Sb, Hg, Tl, Pb, Bi, P and various rare earth metals (La, Ce, Gd, etc.). In addition to metals, nanostructures of nonmetals (e.g., B, Si, P, As, Ge, Se, Te, etc.), their oxides, hydroxides and organic compounds may be similarly formed. Examples of such nanostructures (of various metals, semimetals, metal alloys, metal (or semimetal) oxides, metal (or semimetal) hydroxides, metal (or semimetal) alkoxides and other metal-comprising compounds) include but are not limited to various (nano)porous metals (or metal oxides, etc.), metal (or metal oxide, etc.) nanoplatelets or flakes (or other planar or flattened particles, including porous ones with an aspect ratio (e.g., thickness to width) in the range of around 1:2 to around 1:2,000,000, including porous ones and a smallest dimension (e.g., a thickness) in the range of around 1 nm to around 900 nm), metal (or metal oxide, etc.) nanowires or nanorods or nanowhiskers or nanostrips (nanoribbons) or nano-needles or nanotubes (or other elongated in one dimension particles with aspect ratio (e.g., diameter to length) in the range of around 1:2 to around 1:2,000,000, including porous ones and a smallest dimension (e.g., a diameter) in the range of around 1 nm to around 900 nm), metal (or metal oxide, etc.) dendritic (e.g., coral-shaped or tree branch-like) particles, metal (or metal oxide, etc.) nanoparticles (including porous nanoparticles) of various shapes and sizes, flower-shaped metal (or metal oxide, etc.), to name a few illustrative examples. In some designs, it may be advantageous to deposit coatings (shells) on the surface of these metal (or metal oxide, etc.) nanostructures (e.g., to improve stability or thermal stability or performance in applications or to improve interface or interphase with another material if used in composites, etc.). In some designs, it may be advantageous to deposit at least a portion of such coatings using one or a combination of vapor deposition methods (e.g., CVD or ALD or PVD, among others). In some designs, it may be advantageous to deposit at least a portion of such coatings using one or a combination of solution-based methods, such as electroless deposition, electrodeposition, sol-gel, layer-by-layer deposition, adsorption or precipitation from a solution, among others. In some designs, it may be advantageous to heat-treat the surface layer formed at elevated temperatures (e.g., typically in the temperature range from around 40° C. to around 1,000° C., depending on the thermal stability of the nanostructures and the coating layer and the desired final product chemistry and microstructure). In some designs, it may be advantageous to combine solution-based coating method(s) with vapor deposition method(s) (e.g., to improve quality or stability or other properties of the (composite) coatings). In some designs, such coating(s) may comprise an organic layer (e.g., a polymer). In some designs, such coating(s) may comprise carbon. In some designs, such coating(s) may comprise a ceramic layer (e.g., a metal oxide, a metal halide, a metal oxyhalide, a metal nitride, a metal oxy-nitride, a metal sulfide, a metal phosphide, their various combinations and mixtures, among others).

In some designs, it may be advantageous to reduce the above-described metal oxide nanostructures to the metal nanostructures. In some designs, it may be advantageous to prevent substantial changes in the shape or form of the metal oxide nanostructures during such a chemical or electrochemical reduction process. In some designs, to enable such a shape preservation, it may be advantageous to use protective surface coatings during the chemical or electrochemical reduction process (e.g., to prevent coarsening), such as those described above. In some designs, the reduction may proceed in a gaseous (including vapor) phase. In some designs, hydrogen or hydrogen-containing gases (e.g., hydrocarbons) may be utilized for such a chemical or electrochemical reduction process. In some designs, the coating may be deposited during or just before a chemical or electrochemical reduction process. In some designs, the reduction may proceed in a liquid phase. In some designs, the chemically or electrochemically reduced nanostructures may be further coated with (another) protective surface layer (e.g., to prevent corrosion or oxidation or to improve performance or properties of the metal nanostructures when used in functional composites or applications, etc.). The suitable temperature for the chemical reduction process may depend on the chemistry and dimensions of the nanostructures (as well as the chemistry of an optional surface layer), temperature dependence of the diffusivity of the chemical or electrochemical reducing agents within the materials (metals and metal oxides) of the nanostructures (and the surface layer), the particular reduction method, temperature dependence of the self-diffusion coefficient of the materials (metals and metal oxides) of the nanostructure, among other factors, but are typically in the range from about −100° C. to about +1500° C. The suitable pressure for the reduction process may similarly depend on the chemistry and dimensions of the nanostructures as well as the process used, but such a pressure is typically in the range from about 0.000001 atm. to about 10,000 atm. For economic reasons, in some designs it may be advantageous to use a pressure of the reducing environment of around 1 atm.

As discussed briefly in the background above, high catalytic activity, excellent thermal conductivity and outstanding electrical conductivity makes nanoporous (or, more generally, high specific surface area, e.g., from about 0.1 $m^2/g$ to about 2,000 $m^2/g$) copper (NPCu) and other metal and metal oxides attractive for a broad range of applications. Unfortunately, certain traditional NPCu synthesis routes rely on elaborate procedures, expensive equipment, and highly corrosive chemicals while producing harmful waste products. One or more example implementations of the process of FIG. 1 by contrast provides for a less expensive and environmentally friendlier synthesis of Cu (and other metal) nanostructures with open porosities via, for example, chemical dealloying of Cu—Ca alloys (e.g., CuCa and $CuCa_2$) in aqueous solutions (including pure water). By varying time, pH, and/or temperature, various microstructures with different geometries may be synthesized, such as ranging from Cu sponge and NPCu of various pore size distribution, to Cu nanoparticles (e.g., Cu nanoplatelets/nanoflakes to Cu nanoflowers and nanoneedles), Cu nanorods, and copper oxide (CuO) nanoneedles, among others. In one or more embodiments of the present disclosure, the synthesis is also fast, requires little energy consumption, and forms $H_2$ from water as a useful bi-product.

Additionally, one or more example implementations of the process of FIG. 1 are directed to NPCu synthesis techniques for controlling the length scale (e.g., between 12-30 nm) while minimizing synthesis time (e.g., to less than 12 h; in some designs—to less than 240 h; in some designs—to less than 2 h).

In one illustrative example for an energy storage application, a lithium titanate (LTO) coating may be infiltrated onto the inner surface of nanoporous Cu particles, producing high rate anodes for Li-ion batteries or asymmetric supercapacitors capable of providing nearly 50mAh/g during about 20 s charging while retaining about 70% of the initial capacity after 1000 charge-discharge cycles, as will be described in more detail below. In some applications, this provides substantially higher charge-discharge rates when compared to bare LTO used in Li-ion battery or Li-ion supercapacitor electrodes. Similarly to LTO, other active materials (e.g., materials that store ions, such as Li or Na or other ions) may be deposited on the surface of metal (or metal oxide) nanostructures for electrochemical energy storage and other applications. In another example, the disclosed techniques may be applicable to a broad range of applications of similarly produced Cu and/or other metal and metal oxide (or hydroxide, alkoxides, etc.) nanomaterials and nanostructures for use in various energy storage (e.g., capacitors, supercapacitors, batteries, etc.), energy conversion (e.g., fuel cells), specialized heat-exchangers with nanosize pores, nanoreactors, catalysis, water purification, anti-bacterial, biomedical and other applications. For example, in some designs it may be advantageous to utilize other conductive nanostructures (e.g., metal nanowires or metal flakes, etc.) as conductive additives in various composites, electrodes used in energy storage or energy conversion devices as well as either active or support materials in catalysts, biomedical and other applications.

One specific example implementation of the process of FIG. 1 will now be described with respect to an alloy of Cu and Ca. In general, alloying and dealloying of copper-calcium (Cu—Ca) alloys may be achieved in different ways under different process parameters and according to different embodiments. Two intermediate stoichiometric phases, CuCa and CuCa$_2$, may be synthesized from metallic Cu and Ca via an induction heating technique, for example, which allows fast heating to 600° C., exceeding the eutectic temperature, in 2 minutes. As a working example, CuCa and CuCa$_2$ alloys were synthesized using 0.25 mm thick copper (99.98%) sheets and granular Ca (99%). The metals were heated up to about 750° C. with an induction heater at a heating rate of approximately 895° C. min' in a graphite crucible. Temperature was monitored using an optical pyrometer. Once melted, samples were stirred under continued heating for 1 minute to ensure homogeneity. After homogenizing, the melt was poured into a graphite mold and allowed to naturally cool to around a room temperature in an Ar atmosphere (at a cooling rate of approximately 150° C.

In an example, the chemical dealloying of CuCa and CuCa$_2$ (and other Cu—Ca alloys) may be achieved by exposure of the alloys to low-cost, environmentally friendly hydrophilic solvents, such as water or alcohols (e.g., methanol, ethanol, etc.). Ca reacts with the solvent to form soluble Ca hydroxide or alkoxide. While Ca dissolves from the alloy (see Eq. 1 below), the remaining Cu atoms reorganize via surface diffusion to form different architectures by a modification of such factors as pH, temperature, solvent composition and time. In these conditions, Ca is substantially or completely dissolved and Cu is yielded in a substantially pure and oxide-free form due to its low reactivity. This reaction may take place in CO$_2$-free conditions to provide for the formation of water soluble Ca(OH)$_2$ with no insoluble Ca species formed, such as calcium carbonate (CaCO$_3$). The soluble Ca(OH)$_2$ can be easily decanted from the Cu precipitate. In some cases, hydrochloric acid (HCl) can be utilized to quench the non-soluble calcium species released, such as CaCO$_3$, which can be formed from an air leak in the system.

$$CuCa(alloy)+2H_2O=Ca(OH)_2+H_2\uparrow+(nanoporous)Cu \qquad (Eq.\ 1)$$

In some embodiments, in order to speed up the dealloying reaction, a CuCa (or CuCa$_2$ or other Cu—Ca alloy) chunk may be ground into a powder prior to dealloying. Returning to the working example above, the alloy powder was placed in solvent at a ratio of 1 mg:1 mL for a designated time without stirring/agitation. The final samples were washed with solvent until neutral to remove the soluble Ca residue (calcium hydroxide) and then dried in a vacuum oven at elevated temperature (e.g., 60° C. for 1 h).

One architecture that may be achieved via chemical dealloying of CuCa and CuCa$_2$ in aqueous solutions as disclosed herein is a sponge-like NPCu. This process involves only the use of water at pH 7, room temperature, and a 12 h reaction time, and images of these NPCu can be seen in FIGS. 1A-1B and FIG. 2A. First, the hydrogen evolution begins once the alloy is immersed in water (see Eq. 1 above). The dissolution of Ca(OH)$_2$, produced upon reaction with water, creates the channels in the alloys through which Ca continues to dissolve. Hydrogen evolution and associated stresses may also contribute to expanding the pore size and forming larger cracks in the material (white plane ellipsoids, FIG. 1A). The pore (crack) sizes typically increase as the reaction time increases, giving rise to the pores of the Cu "sponge" and creating a bi-continuous porous Cu structure. Formation of such a pore structure can be related to the "pit-formation mechanism", according to which the dealloyed adatoms (Cu in this case) merge into the larger (Cu) clusters, thus forming pores (pits) in the dealloyed sample. The merge from the adatoms clusters can be seen in FIG. 1A (white dashed ellipsoids). The prepared Cu sponge further changes its morphology through coarsening over time (e.g., from 12 h to 72 h) upon exposure of the alloy to water at room temperature. Coarse Cu grains are refined into spherical forms with more micron-sized pores formed after later (e.g., after 72 h) dealloying (FIG. 1C).

In another embodiment, methanol and ethanol can also be used to dealloy CuCa (that is, to selectively dissolve Ca from the Cu—Ca alloy) into NPCu. However, in some embodiments, this approach may result in significantly slower reaction rates due to the heavy precipitation of less soluble calcium alkoxides. The reaction rate may be enhanced by using suitable catalysts. In contrast to the reported reactivity of Al—Li and Mg—Li with alcohols, which proceed with the formation of corresponding Al- and Mg-alkoxide nanowires without the use of any catalyst, CuCa or CuCa$_2$ behave differently. An extra activation of as-synthesized Cu may be advantageous to make it react with alcohols to turn the reaction products into the copper alkoxides.

Table 1 below illustrates the effect of a variety of factors including growth time, temperature, pH (of water or the aqueous solution), and alloy composition on NPCu growth from Cu—Ca alloys. More specifically, the following example factors are illustrated at the following example levels: growth time (12 h, 72 h), temperature (25° C., 60° C.), pH (1, 7, 14), and alloy composition (in this example—CuCa or CuCa$_2$). After synthesis, SEM was used in the tabulated results to measure the length scale of the microstructure via manual measurements (N=50) of the ligament length. Notably, in some cases, other morphologies are observed (listed as having ligament lengths of zero in Table 1). This variation greatly increases the number of possible nanostructures one can synthesize via dealloying of CuCa and CuCa$_2$. In the case of the selected example growth conditions, which resulted in multiple microstructures due to either incomplete reaction of Cu—Ca alloy or precipitation of Ca containing by products, only the NPCu ligaments were measured, as shown in Table 1.

TABLE 1

Example NPCu synthesis conditions and resultant structures.

| Example | Temp, C. | Time, h | pH | Alloy Comp. | NPCu Lig. (nm) | Cu Micro-structures* |
|---------|----------|---------|-----|-------------|----------------|----------------------|
| 1  | 60 | 72 | 1  | CuCa$_2$ | 0    | +          |
| 2  | 60 | 12 | 14 | CuCa     | 0    | ♦          |
| 3  | 25 | 72 | 7  | CuCa     | 16.4 | ■, +       |
| 4  | 25 | 72 | 14 | CuCa$_2$ | 20.4 | ■, +       |
| 5  | 25 | 12 | 1  | CuCa$_2$ | 0    | +          |
| 6  | 25 | 12 | 14 | CuCa     | 0    | ▲          |
| 7  | 60 | 12 | 14 | CuCa     | 0    | +          |
| 8  | 60 | 72 | 14 | CuCa$_2$ | 0    | ♦          |
| 9  | 60 | 72 | 7  | CuCa$_2$ | 23.8 | ■, ▲, ♦    |
| 10 | 60 | 72 | 1  | CuCa     | 0    | ●, +       |
| 11 | 25 | 72 | 7  | CuCa     | 19.3 | ■          |
| 12 | 25 | 72 | 14 | CuCa$_2$ | 27.6 | ■          |
| 13 | 25 | 12 | 1  | CuCa     | 0    | ●          |
| 14 | 25 | 12 | 7  | CuCa     | 11.9 | ■          |
| 15 | 60 | 72 | 1  | CuCa     | 0    | ●, +       |
| 16 | 25 | 12 | 1  | CuCa$_2$ | 0    | +          |
| 17 | 60 | 12 | 7  | CuCa$_2$ | 18.2 | ■, ▲, +    |
| 18 | 60 | 12 | 7  | CuCa$_2$ | 18.1 | ■, ▲       |

Figure 3A:
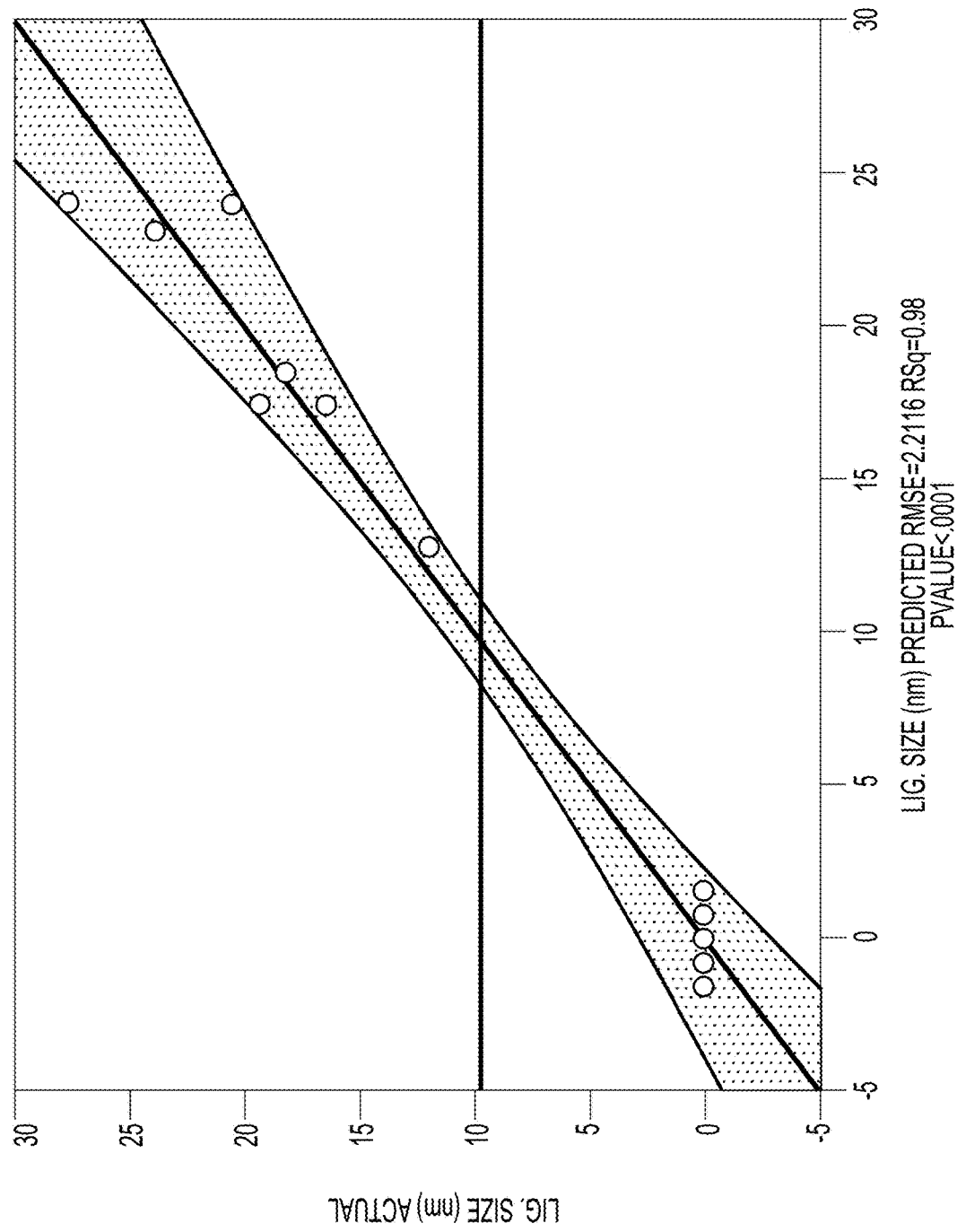
FIGS. 3A-3B illustrate an example ligament length model.

*Microstructures: ■-nanoporous Cu, ▲-nanoflowers, ♦-nanoflakes, ●-dendrites, +-microparticles Various structural properties may therefore be tuned as desired for a given application. This tuning may be assisted using various empirical models. As an example, FIG. 3A illustrates an empirical model in which, based on observed ligament lengths for different growth conditions, the data was modeled using a Standard Least Squares method using the main, mixed, and quadratic effects. Strong effect heredity was assumed for all higher order terms, and terms having a p-value greater than 0.05 were removed from the model, leaving the significant terms as shown in FIG. 3A with the model parameters shown below in Table 2. This model was highly predictive with an R-squared value of 0.98, root mean squared error of 2.212, and a whole model p-value less than 0.001 (FIG. 3A).

TABLE 2

Parameter estimates for example ligament length model of NPCu.

| Term | Estimate | Std Err. | t Ratio | Prob > \|t\| |
|------|----------|----------|---------|--------------|
| Intercept        | 23.9436  | 1.2130 | 19.74  | <.0001* |
| Temp. (25,60)    | −1.7306  | 0.5938 | −2.91  | 0.0195* |
| Time h (12,72)   | 2.31430  | 0.6332 | 3.65   | 0.0064* |
| pH (1,14)        | 5.61624  | 0.7721 | 7.27   | <.0001* |
| Alloy [CuCa]     | −4.2687  | 0.5697 | −7.49  | <.0001* |
| Temp. * pH       | −4.0735  | 0.8326 | −4.89  | 0.0012* |
| pH * pH          | −23.368  | 1.6785 | −13.92 | <.0001* |
| Temp. * Alloy [CuCa] | 5.42335 | 0.7866 | 6.89 | 0.0001* |

Figure 3B:
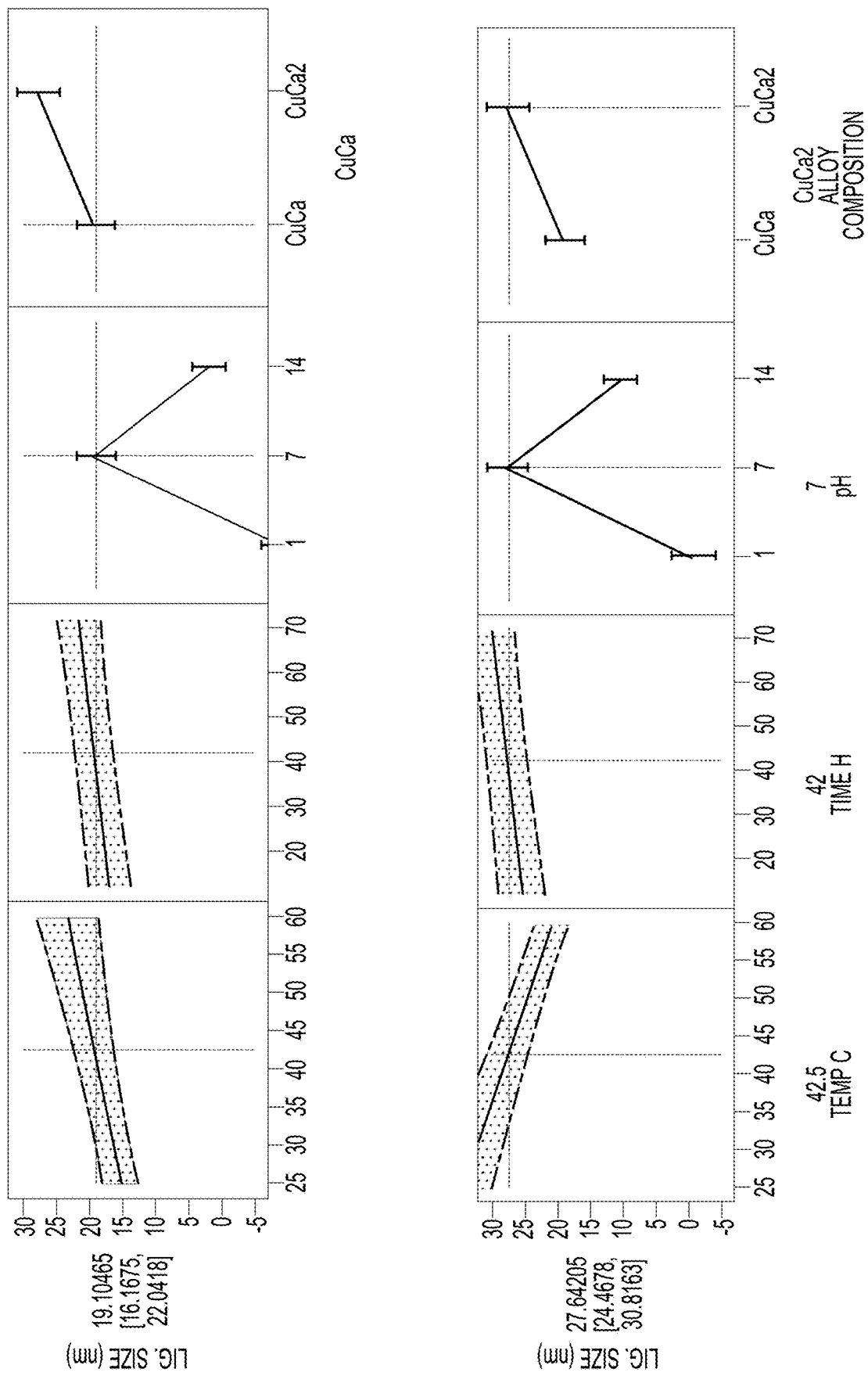

In this embodiment, the most robust growth is observed for pH 7 conditions, with increasing time showing a weak increase of the ligament length, as aging occurs due to surface diffusion (FIG. 3B). The small range of observed ligament lengths was unexpected due to the large variation in synthesis conditions, indicating that the disclosed NPCu synthesis method is very robust. Table 1 also shows the variability of producible structures, such as nanoflowers, nanoflakes, dendrites, nanoneedles and microparticles of Cu. Some of these examples are further illustrated in FIGS. 1D-1E.

Figure 2B:
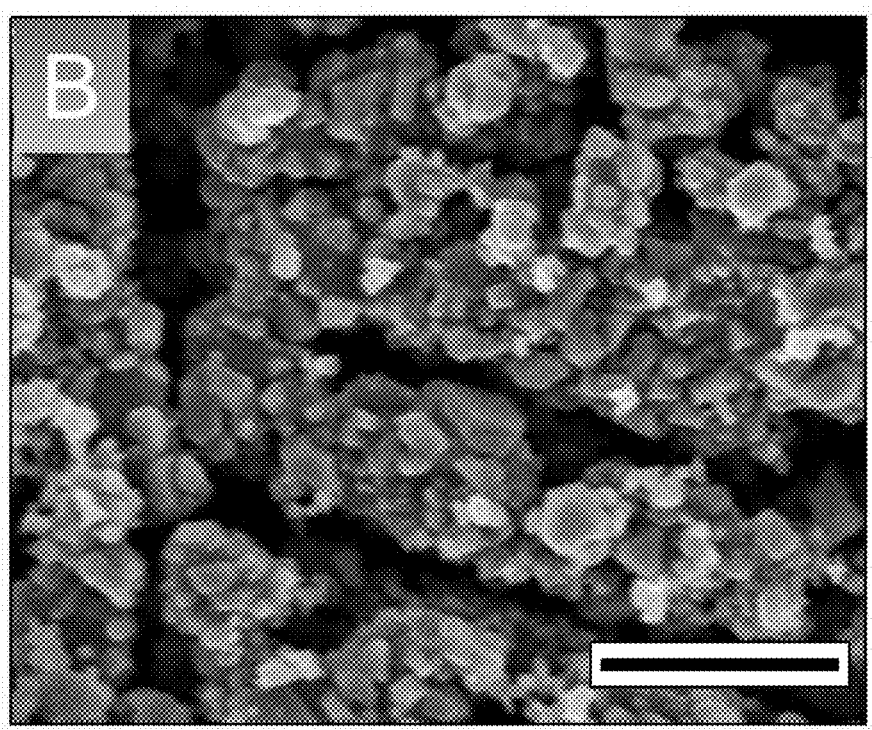
Figure 4C:
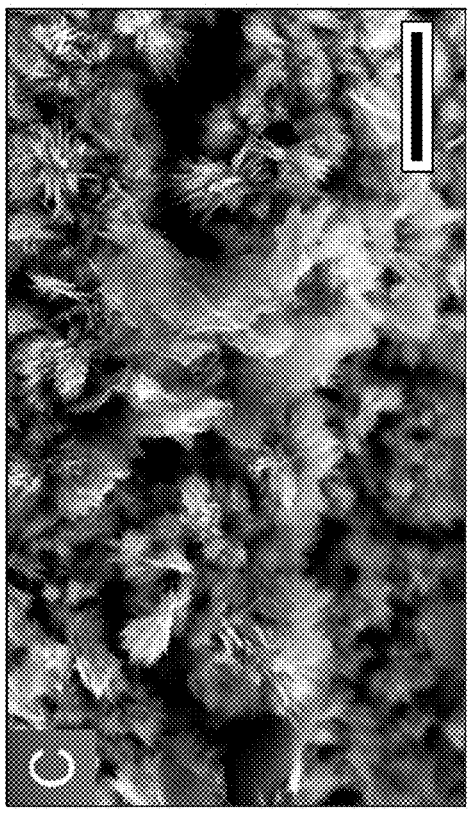
FIGS. 4A-4D illustrate: SEM micrographs and EDS of copper dendrites obtained by CuCa dealloying at pH 1 and room temperature, scale bar 8 μm (FIGS. 4A-4B); and SEM micrographs and EDS of copper oxide nanoflakes ("urchins") obtained by CuCa dealloing at pH 7 and room temperature in the atmosphere of oxygen, scale bar 4 μm (FIGS. 4C-4D).
Figure 4A:
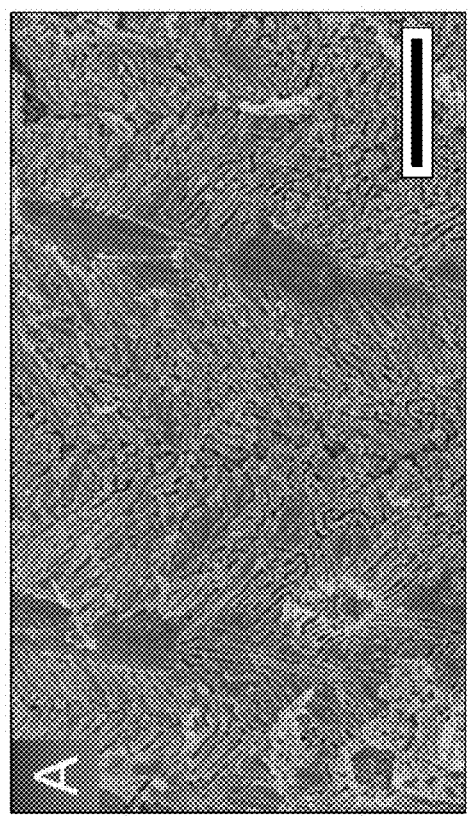
Figure 4D:
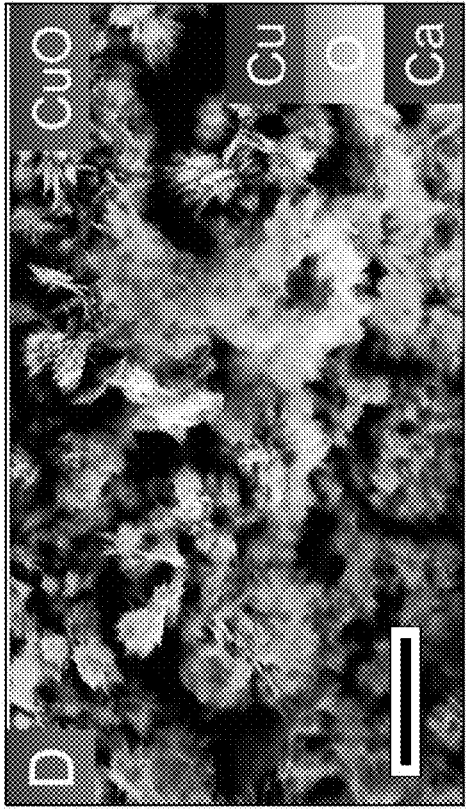
Figure 4B:
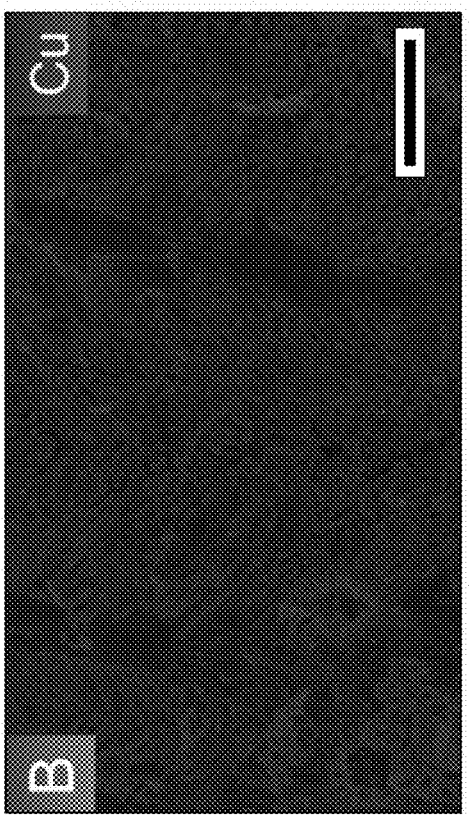

For example, dealloying in a hydrochloric acid (HCl) solution at pH 1 leads to rod-like Cu structures with diameters ranging from 100-500 nm and a 10-20 aspect ratio (FIG. 1D and example 13, Table 1). The architecture of the acid-dealloyed sample represents a bi-continuous copper structure with no separated rods (FIGS. 4A and 4B). The effect of the acid on the elongations of the ligaments may be related to a much higher diffusion rate of the Cu in acidic solutions compared to neutral solutions. In addition, in the diluted HCl, a water-soluble CaCl$_2$ forms, while in water, less-soluble Ca(OH)$_2$ forms, which is less prone to leaving the dealloying site. This may be the cause of the increased concentration of Ca ions/particles near the dealloying site. Lower Cu mobility leads to more homogenous meso-pore size distribution. It is noted that CuCa dealloying at pH 1 and 60° C. in water in addition to dendrites yields microparticles (Table 1, example 10). At the increased temperatures, copper mobility is much higher as compared to the room temperature dealloying. In addition to that, CuCa$_2$ dealloying at pH 1 at 60° C. also gives rise to large particles and not the elongated structures (FIG. 2B, also example 1, Table 1). In one or more embodiments, higher Ca content in the CuCa$_2$ alloy makes the dealloying reaction rate visibly much faster. More intense hydrogen evolution in the case of CuCa$_2$ dealloying provides different mass transfer, and in some cases compared to CuCa aside from the water/room temperature/pH 1 dealloying, the geometries of the dealloyed products are substantially different (compare FIG. 2A with FIG. 2B).

In one embodiment, when dealloying in the presence of polyethylene glycol (PEG-200), the formation of Cu particles is observed with diameters ranging from 300-400 nm (FIG. 1E). In this example, PEG acts as a matrix to entrap smaller copper clusters and prevent particles aggregation. In another example, CuCa dealloying in the presence of O$_2$ at room temperature at pH 7 shows needles-like structures of CuO (FIG. 1F), the formation of which can be explained by the Cu atom movement preferentially along the axis of the needle where oxygen atoms are adsorbed. The EDS mapping and more SEM micrographs of CuO nanoneedles are shown in FIGS. 4C and 4D.

As discussed briefly above, the structures and techniques disclosed herein may be useful in a variety of applications. For example, it will be appreciated that the development of high-rate, high-capacity anodes for supercapacitors and Li-ion (or Na-ion, etc.) batteries is important for a range of high-power energy storage applications. The use of NPCu as a conductive substrate for deposition of lithium titanate (Li$_4$Ti$_5$O$_{12}$, or LTO) nanoparticles, as an example application for the purpose of significantly increasing anode electrical conductivity, is discussed in detail below. LTO exhibits a spinel crystal structure with high volumetric capacity for Li, high thermal stability, and therefore increased levels of safety when used in Li-ion batteries. It exhibits nearly zero strain upon lithiation and delithiation, allowing higher rate and cycling stability, and, therefore, has been successfully commercialized. One conventional limitation of LTO anodes, however, is a reduced cell voltage, moderate capacity (175 mAh g$^{-1}$), and, importantly, low electrical conductivity ($\sigma_{elec}$=10$^{-12}$–10$^{-13}$ S cm$^{-1}$). Bare LTO shows reduced capacity (55 mAh g$^{-1}$) although retaining good cycle stability (100 cycles). To overcome low rate performance, LTO can be assembled in accordance with various embodiments herein into nanostructures with reduced diffusion distance and smaller separation of conductive additives from electrochemically reactive sites. Confinement of LTO into different conductive supports or its doping also provide improved electrical and ionic conductivities.

Figure 5:
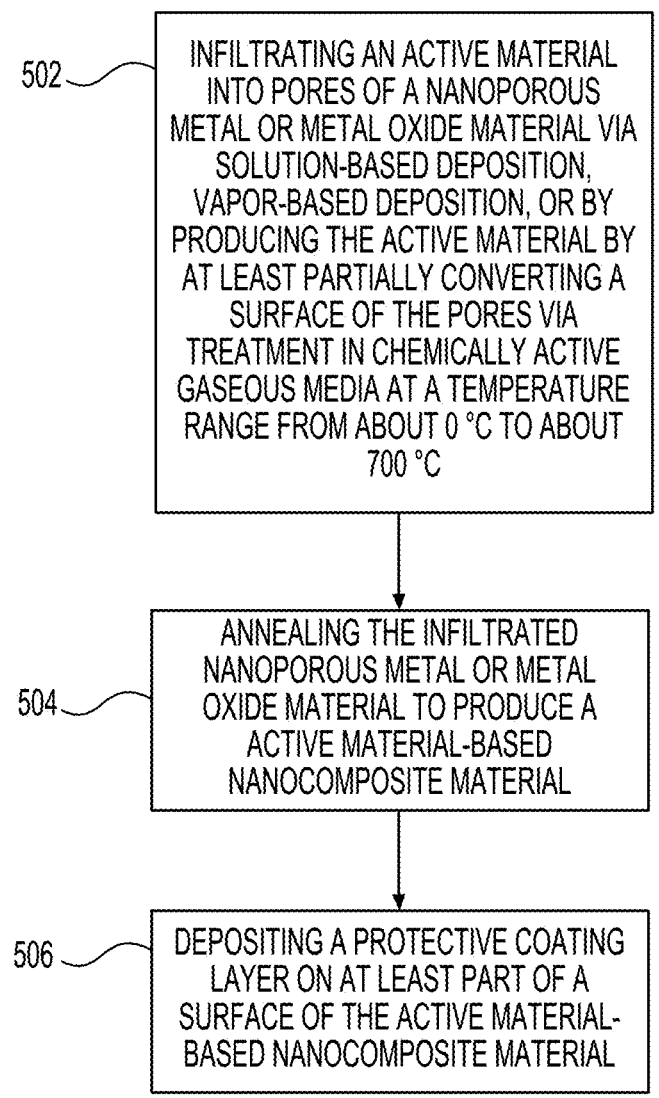
FIG. 5 illustrates a process of synthesizing an active material-based nanocomposite material in accordance with an aspect of the disclosure.

FIG. 5 illustrates a process of synthesizing an active material-based nanocomposite material in accordance with an aspect of the disclosure. In an example, the active material-based nanocomposite material may correspond to an LTE-based nanocomposite material, but the embodiment of FIG. 5 can be applied with respect to active materials other than LTO (e.g., Si, Sn, $CuF_2$, $FeF_3$, —Fe—F, Cu—Fe—O—Fe composition, etc.).

At block 502, an active material is infiltrated into pores of a nanoporous metal or metal oxide material via solution-based deposition, vapor-based deposition, or by producing the active material by at least partially converting a surface of the pores via treatment in chemically active gaseous media at a temperature range from about 0° C. to about 700° C. In an example, the nanoporous metal or metal oxide material that is infiltrated at block 502 may be produced via a chemical dealloying process, such as the process described above with respect to FIG. 1. More specifically, the nanoporous material may correspond to a nanomaterial that is produced in accordance with the process of FIG. 1 as described above, whereby one of the desired set of microstructure characteristics that is exhibited by the nanomaterial is being nanoporous.

At block 504, after the infiltration of block 502, the infiltrated nanoporous metal or metal oxide material is annealed to produce the active material-based nanocomposite material. At 506, a protective coating layer is deposited on at least part of a surface of the active material-based nanocomposite material. In an example, the active material-based nanocomposite material is NPCu. In another example, the active material-based nanocomposite material may include carbon.

As will be described below in more detail, the active material that infiltrates the pores of the nanoporous metal or metal oxide material at 502 may correspond to an LTO precursor that includes a Ti source at a given concentration in a solvent, and the infiltration at block 502 infiltrates the LTO precursor substantially inside of the pores of the nanoporous material without substantial precipitation of the LTO precursor onto one or more surfaces of the nanoporous material that are outside of the pores.

Figure 5A:
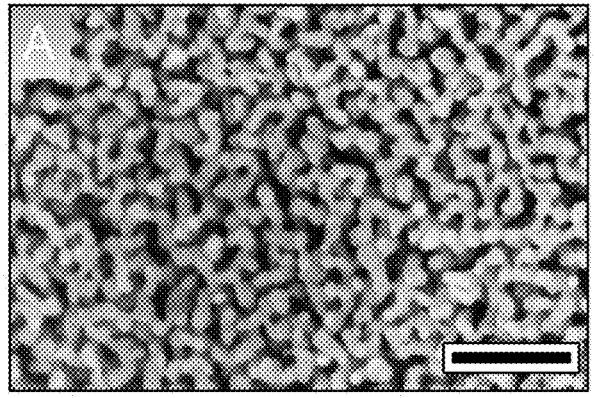
Figure 7A:
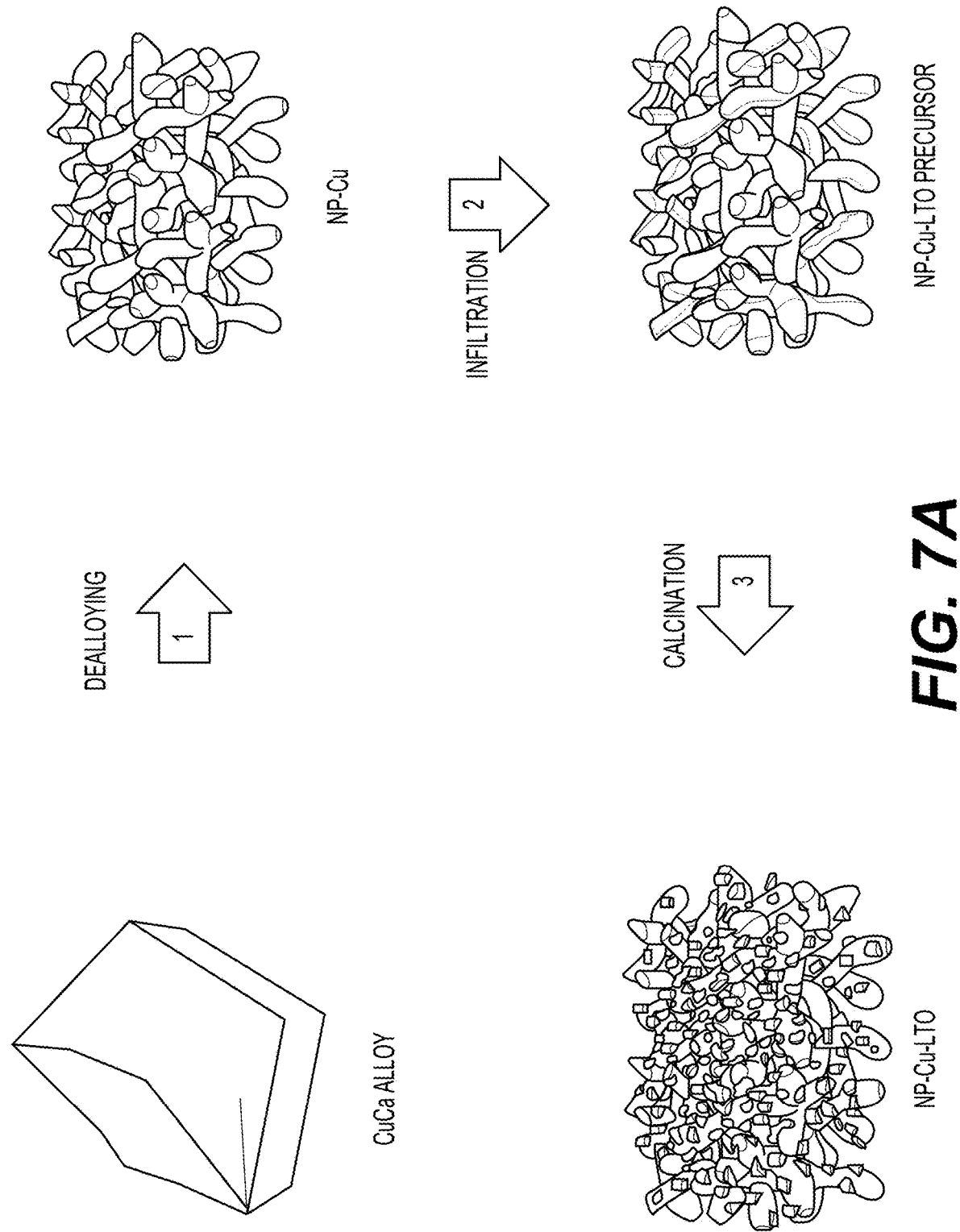
FIG. 7A illustrates a schematic of NPCu-LTO synthesis, including (1) chemical dealloying, (2) infiltration of LTO precursor, and (3) calcination.

In one example implementation of the process of FIG. 5, vacuum infiltration may be used with subsequent calcination to synthesize the NPCu-LTO nanocomposite (FIG. 5A). The infiltration of a concentrated Ti source (e.g., 2.0-2.5 M titanium(IV) n-butoxide in methanol) may reduce the sorptivity of the NPCu and cause clumping and non-uniform infiltration. This may be due to the reaction between the active Cu and Ti(IV) n-butoxide with excessive formation of Cu(I) butoxide, which is unstable and may decompose to CuH. This side product may potentially cause the decrease in sorptivity and capillary suction by blocking the pores of NPCu (FIG. 6). The visibly observed change of the NPCu color from red to black during the infiltration supports the mechanism described above. Decreasing concentration of a Ti source to 0.2 M in methanol does not cause any side reactions and allows for the confinement of LTO precursor within the pores of NPCu without the precipitation of the LTO precursor on the surface of the sponges (FIG. 1B). In one example, an optimal annealing atmosphere of LTO precursor may be $H_2$ diluted in Ar. The annealing in $H_2$ creates vacancies in the crystal structure of LTO, thus enabling higher ionic conductivity and rate capability of LTO while preventing the decomposition of LTO to $Li_2O$ and $TiO_2$. Annealing of the NPCu-LTO precursor in $H_2$/Ar atmosphere at about 600° C. for at least about 5 hours (step 3, FIG. 7A), for example, may be used to achieve a crystalline LTO.

Figure 7B:
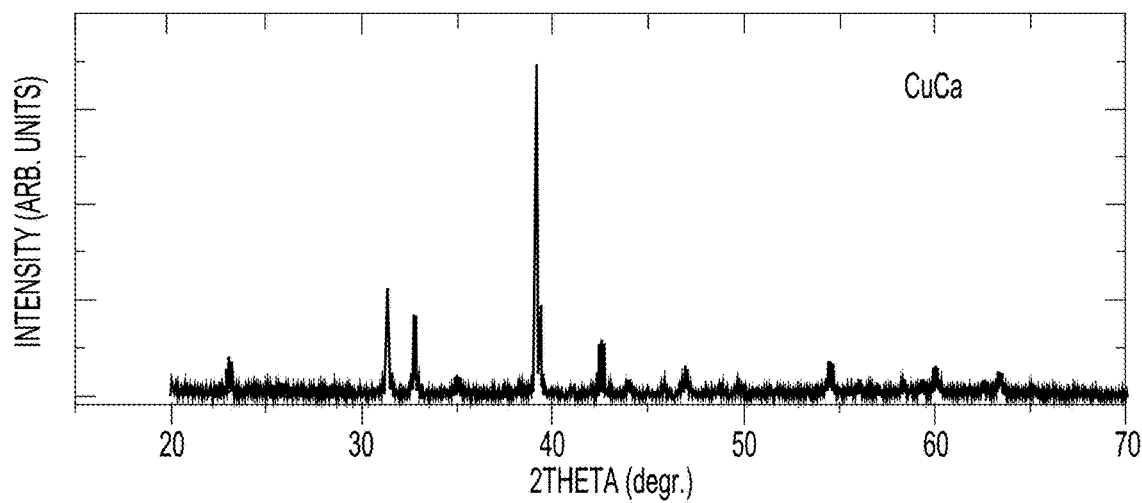
FIGS. 7B-7C illustrate X-ray diffraction (XRD) of CuCa (FIG. 7B); NPCu (FIG. 7C); and NPCu-LTO (FIG. 7D).
Figure 7C:
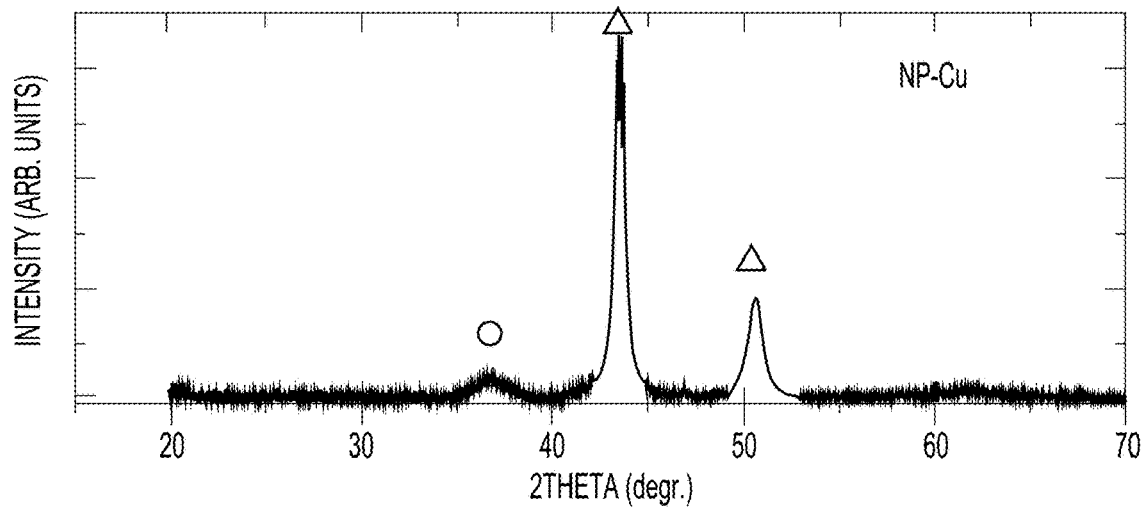
Figure 7D:
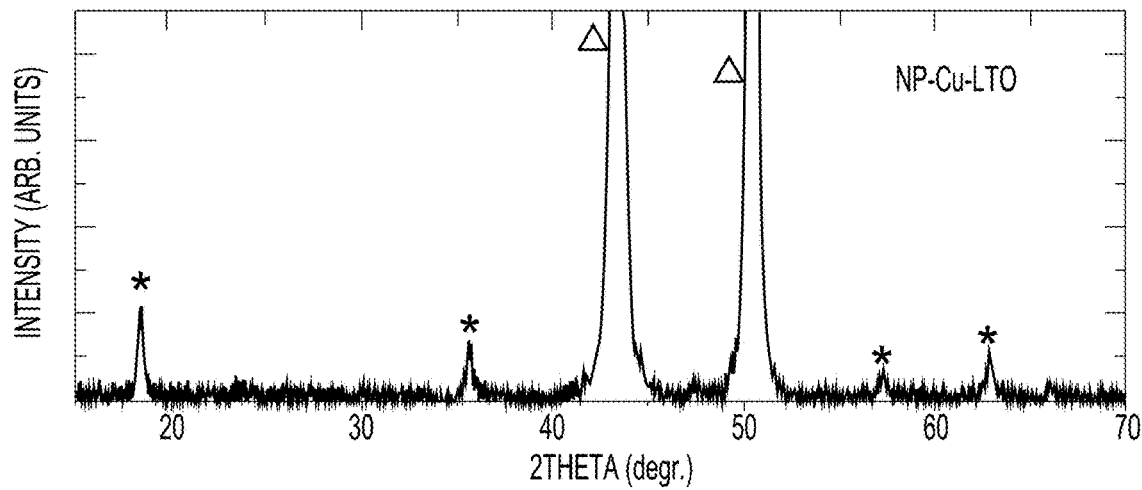
Figure 8:
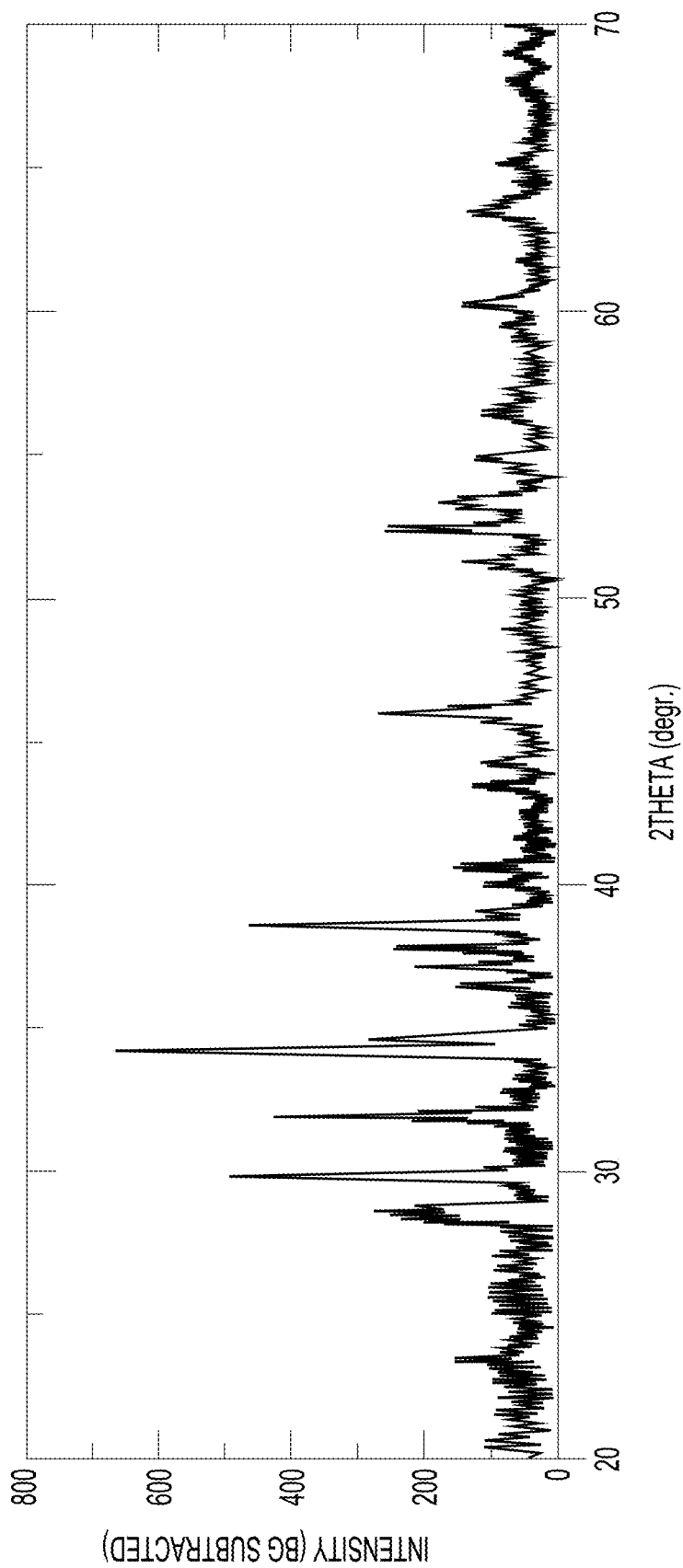
FIG. 8 illustrates an XRD of $CuCa_2$ before dealloying.

The peaks of CuCa and $CuCa_2$ can be well indexed with known values. (FIG. 7B, and FIG. 8). Dealloyed from CuCa and $CuCa_2$ NPCu (FIG. 7C) show peaks in XRD located at $2\theta=43.3, 50.5°$, which correspond to (111), and (200) planes of FCC Cu, respectively. An insignificant amount of $Cu_2O$ in the NPCu-1 can sometimes be seen (located at $2\theta=36.7°$), which may be due to exposure of the NPCu-1 to air during XRD collection. In fact, in some applications, the presence of some copper oxide may even be favorable to accommodating LTO in the pores of the copper due to the formation of Li—O—Cu and Ti—O—Cu coordination bonds. The peaks of the spinel LTO after annealing the precursor can be well indexed to the (111), (311), (333), and (440) planes (FIG. 7D). The LTO peaks in the diffraction pattern are broad, indicating a small size of the crystallites, which is in accordance with High-Resolution TEM (HRTEM) results (FIG. 5E-F). Due to the overlapping with the (111) peak of Cu, the (440) peak of LTO cannot be seen.

Figure 5B:
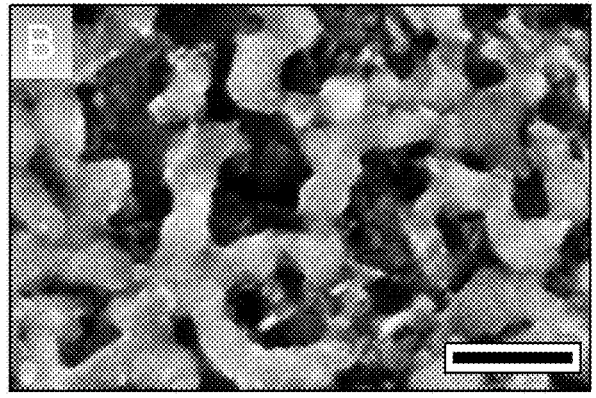
Figure 5C:
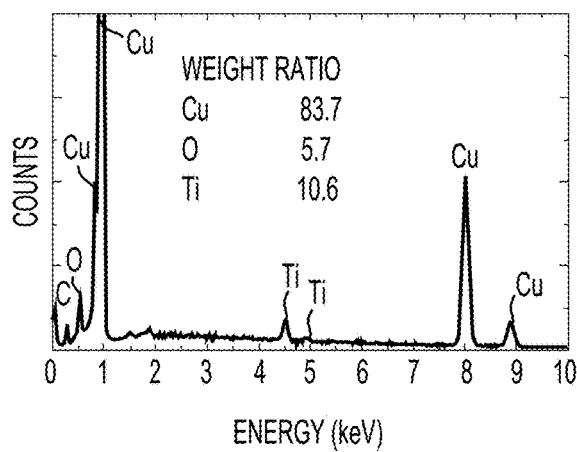
Figure 5D:
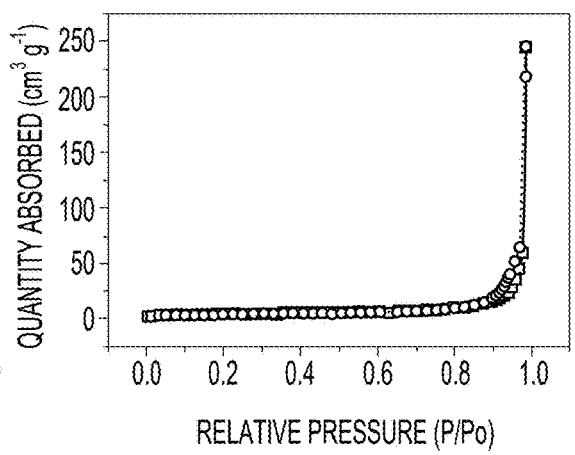

FIGS. 5A-5B show select SEM studies illustrating the morphology and dimensions of example NPCu. FIG. 5A shows corresponding ligament lengths that are 15-20 nm on average (see also, Table 1). FIG. 5B reveals homogenous LTO confinement within NPCu. FIGS. 9C and 8 show Energy Dispersive Spectroscopy (EDS) analysis of the chemical composition of LTO-NPCu. FIG. 5D shows a Brunauer-Emmett-Teller (BET) specific surface area (BET SSA) analysis indicating a specific surface area of the example NPCu to be about 15 $m^2$ $g^{-1}$, which is about five times larger than that of the $Li_4Ti_5O_{12}$ particles and seven times larger compared to dealloyed porous Au. The small hysteresis loop at the higher relative pressure indicates the presence of pores with different dimensions. The LTO accommodation into the NPCu leads to a small decrease in a BET-SSE to 6 $m^2$ $g^{-1}$, indicating that the pores remain largely unplugged to sustain the needed porosity for sorptivity and capillary suction.

FIG. 5E illustrates an example TEM image of a NPCu-LTO cluster and shows a polycrystalline nanoporous Cu morphology with LTO crystals confined in the NPCu matrix. FIG. 5F is a high-resolution TEM image that shows an average size of the example LTO crystals to be 10-20 nm. Based on small LTO dimensions and intimate Cu-LTO contact, an effective transfer of electrons from LTO onto Cu substrate may be achieved during charge-discharge cycles.

Figure 9B:
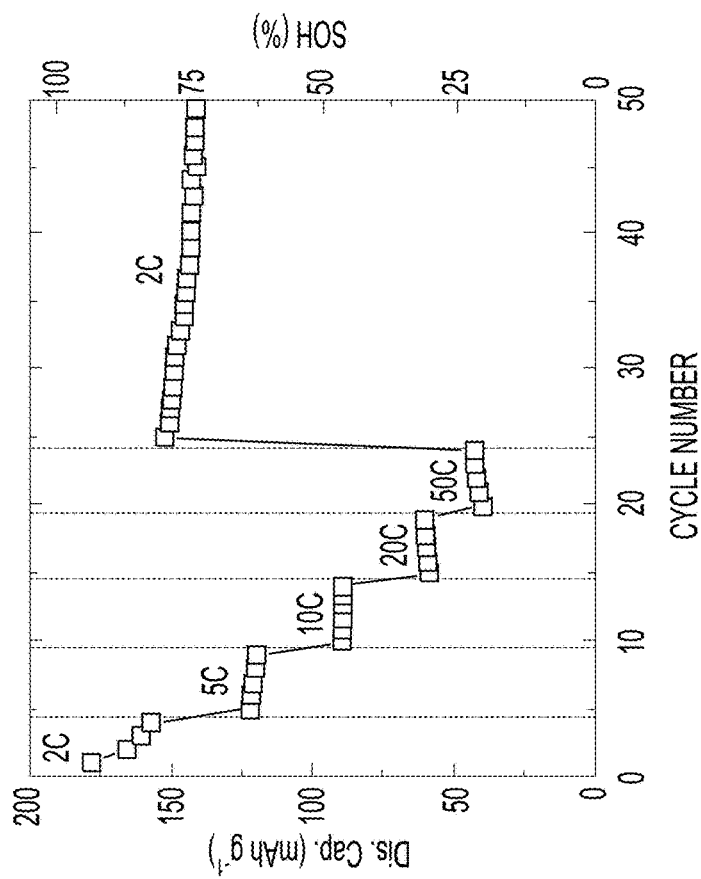
FIGS. 9A-9C illustrate electrochemical measurements of NPCu-LTO/Li samples, including: differential capacity plot of a 2 C charge-discharge cycle after the formation cycle (FIG. 9A); constant current C-Rate testing for NPCu-LTO from 2 C to 50 C (FIG. 9B); and long term 2 C cycling (FIG. 9C).
Figure 9A:
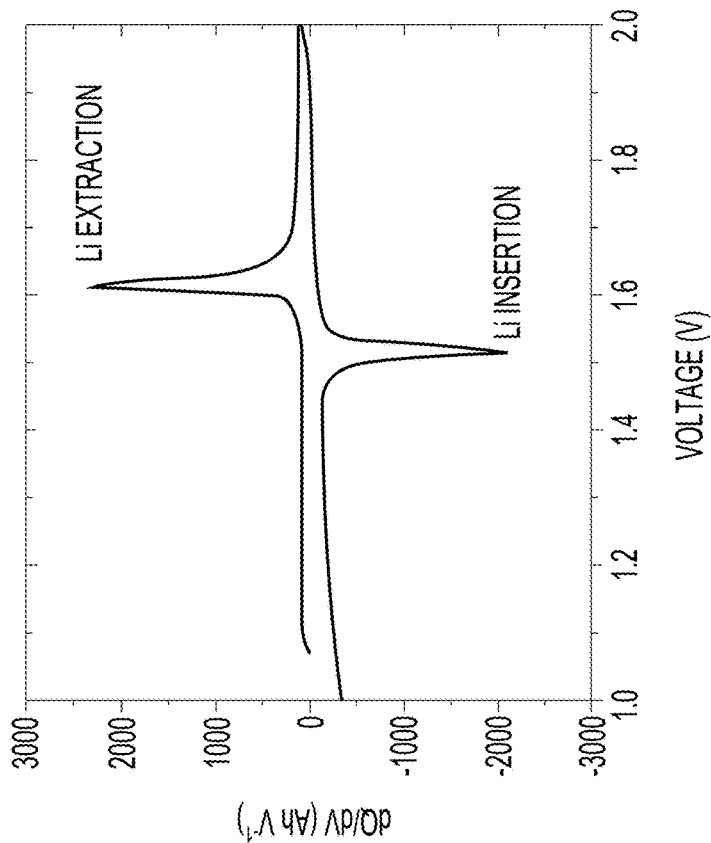
Figure 9C:
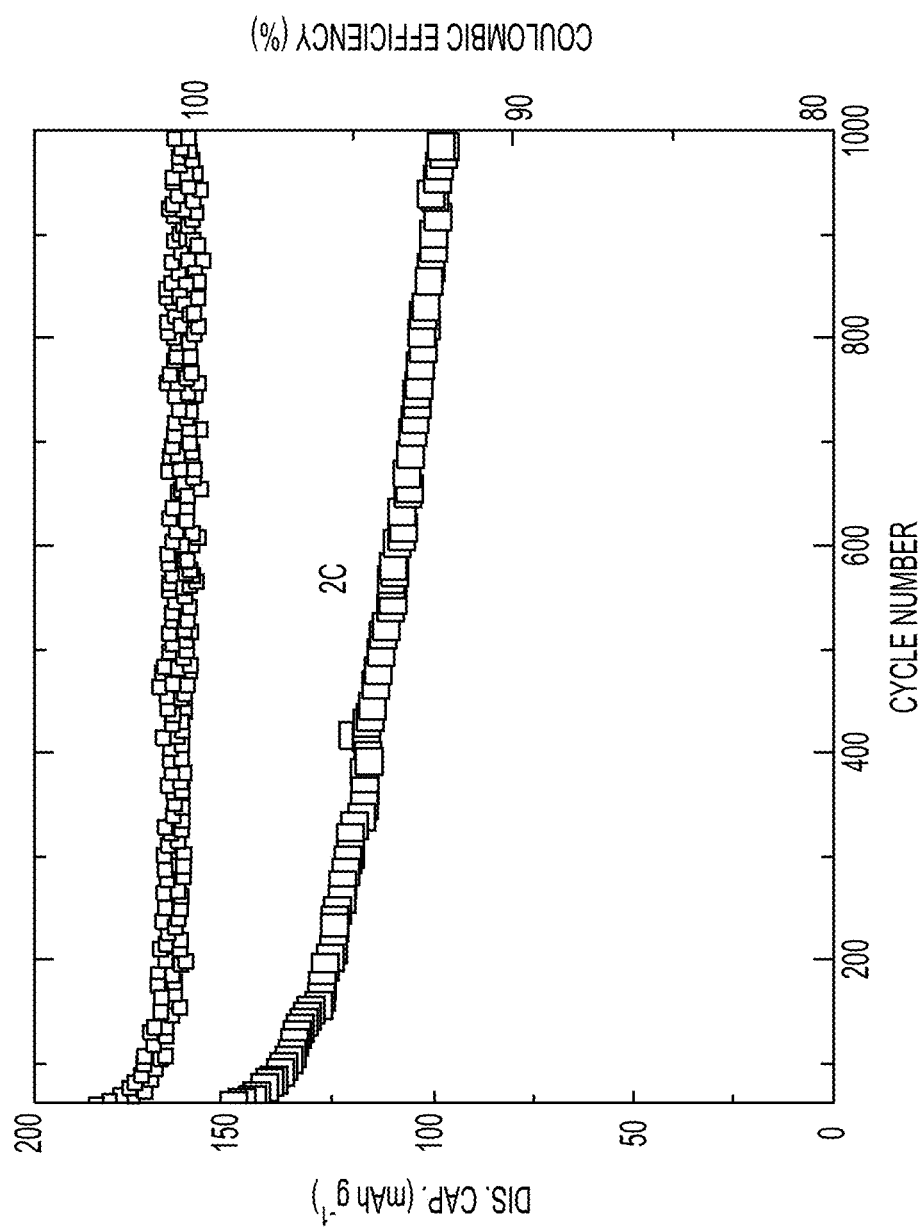

FIGS. 9A-9C illustrate electrochemical performance of an example NPCu-LTO electrode tested in Li half cells. FIG. 9A illustrates differential capacity vs. voltage (dQ/dV vs. V) and shows a narrow Li extraction peak at 1.63 V. A small difference with the Li insertion peak (approximately 0.08 V) indicates higher reversibility of the process (Eq. 2), which is due to the efficient conjuncture of LTO with conductive Cu support.

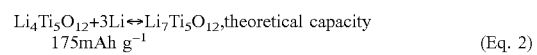

$$Li_4Ti_5O_{12}+3Li \leftrightarrow Li_7Ti_5O_{12}, \text{theoretical capacity } 175 \text{mAh g}^{-1} \quad \text{(Eq. 2)}$$

Additionally, the quality of the dQ/dV vs. V curves suggests that there are no side reactions on the electrode, suggesting the range 1.3-2.2V to be good for the electrochemical tests.

FIG. 9B illustrates a specific deintercalation gravimetric capacity of the NPCu-LTO electrode at 2 C that is approximately 175 mAh $g^{-1}$ (based on LTO mass) reaching its theoretical level. This high gravimetric capacity of LTO in NPCu-LTO composite suggests a uniform deposition and intimate electrical connection of LTO to the conductive Cu. Cycling NPCu-LTO at 2 C, 5 C, 10 C, 20 C and 50 C showed approximately 50% retention of the max capacity at 10 C rate (3 min actual charging and discharging time) and approximately 25% at 50 C rate (20 sec actual charging and discharging time), which is promising for high power applications. FIG. 9C illustrates a high-rate cyclic stability demonstrated at the cyclic rate of 2 C, which showed capacity retention approaching approximately 70% after 1000 charge-discharge cycles with the Coulombic efficiency approaching approximately 100%. Further improvements may be achieved with additional NPCu-LTO composite, electrode and cell-level optimizations.

In the preceding examples, the NPCu-LTO nanocomposite was prepared by an infiltration technique in an Ar-filled glovebox. In an exemplary synthesis, 14.25 mg of lithium acetate and 85 mg of titanium(IV) n-butoxide were dissolved successively in 1 mL of methanol to obtain a transparent precursor solution. The precursor solution was then added to 200 mg copper sponge in batches. A typical 10 min vacuum was applied during the interval of two addition batches. The precursor copper sponge composites were then preheated at 100° C. for 6 h and then calcined at 600° C. for 1.5 h in a 5% $H_2Ar$ atmosphere to obtain NPCu-LTO.

The NPCu-LTO electrodes were prepared and assembled as half cells in 2032 coin cells for electrochemical characterization at room temperature. The anode electrodes were prepared by casting a slurry of NPCu-LTO, carbon black, and polyvinylidene fluoride with a mass ratio of 80:10:10 in N-methylpyrrolidone on Cu foil. The electrodes were vacuum dried at 70° C. for 12 h prior to use. The electrolyte was 1.0 M $LiPF_6$ in acetonitrile. The coin cells were assembled in an Ar-filled glovebox.

Figure 10:
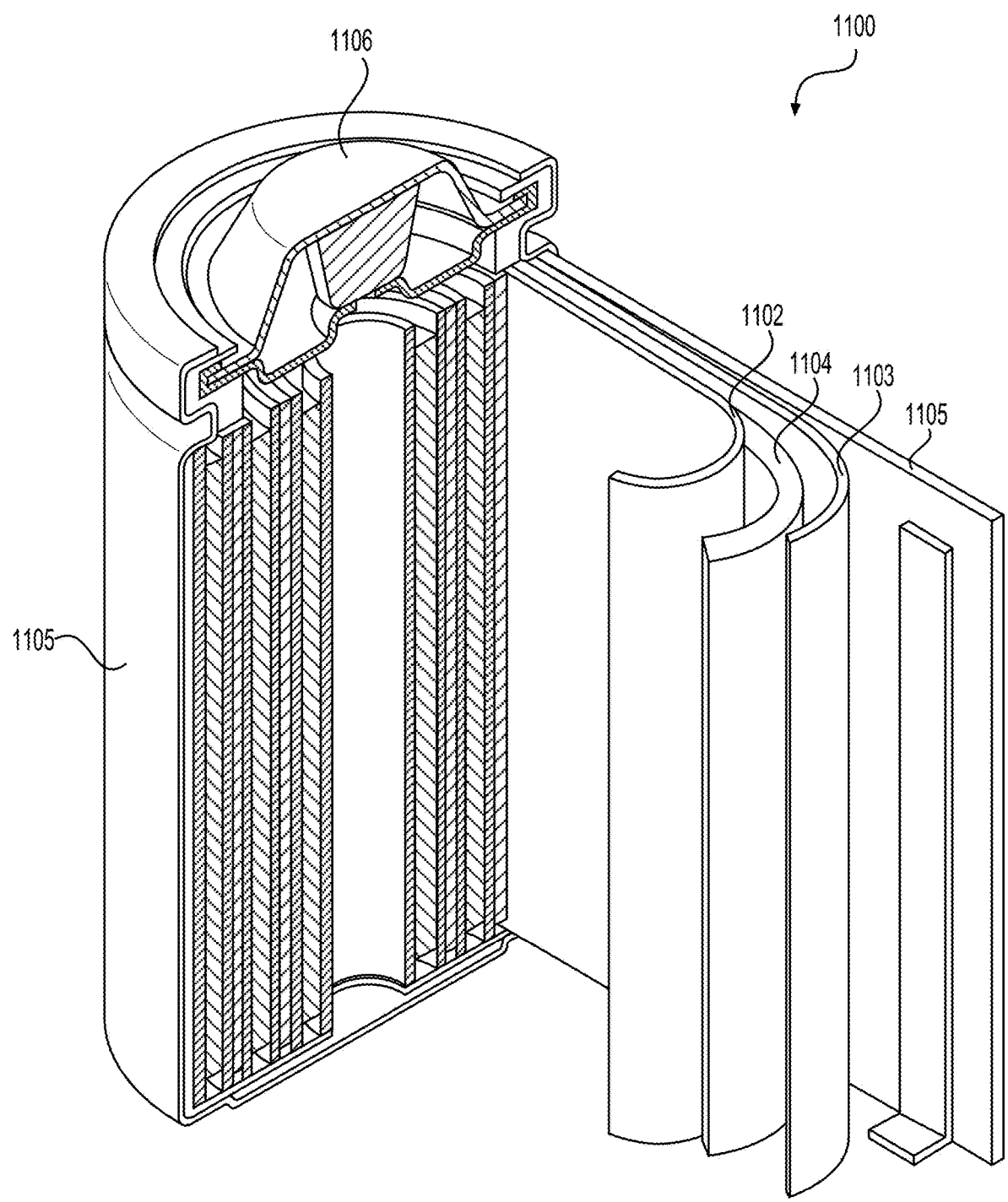
FIG. 10 illustrates an example metal or metal-ion (e.g., Li-ion) battery in which the components, materials, methods, and other techniques described herein, or combinations thereof, may be applied according to various embodiments.

FIG. 10 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 1100 includes a negative anode 1102, a positive cathode 1103, a separator 1104 interposed between the anode 1102 and the cathode 1103, an electrolyte (not shown explicitly) impregnating the separator 1104, a battery case 1105, and a sealing member 1106 sealing the battery case 1105. In addition to Li-ion batteries (referenced herein for brevity and convenience, and because of the current popularity of Li technology), it will be appreciated that various aspects may be applicable to other rechargeable and primary batteries (such as Na-ion, Mg-ion, K-ion, Ca-ion, and other metal and metal-ion batteries, etc.).

As demonstrated above, the disclosed CuCa and $CuCa_2$ dealloying in one or more embodiments is a versatile method of synthesizing Cu and CuO nanostructures, which depends only on fundamental reaction parameters with no required use of sophisticated equipment, reagents and solvents or high temperatures. Therefore, due to the facile preparation of the CuCa and $CuCa_2$ alloys, the abundance and low cost of Ca, the environmental friendliness, scalability and low-cost of the Ca dissolution process, this particular embodiment is useful for both lab-scale and industrial-scale formation of a broad range of Cu nanostructures. In an example, highly electrically conductive nanoporous Cu may be used in high rate electrochemical devices. At commercial scale and high production volumes, high surface area nanoporous Cu and other types of Cu nanostructures are attractive for a broad range of other applications.

As described above, the synthesis of porous particles, porous membranes, nanoparticles, nanowires (including porous nanowires), nanofibers (including porous nanofibers), nanotubes, nano-flakes (including porous nano-flakes), nano-needles, nano-ribbons (including porous nano-ribbons) and other nanostructures of other metals, semimetals, metal alloys, metal oxides, metal hydroxide or metal alkoxides or other metal-containing nanostructures by using the above-described (or similar) synthesis routes may be highly advantageous for energy storage and other applications (some of which have been discussed above).

The produced metal (or metal oxide or metal hydroxide or metal alkoxide or other metal salt) nanostructures may be further assembled into electrodes, larger particles, membranes and other macroscopic structures. They may also be coated with various functional layers by vapor deposition and other routes and combined with other structures and materials for optimum performance in various applications.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of synthesizing a nanomaterial, comprising:
 exposing an alloy comprising (i) Cu and (ii) at least one Group II element selected from Ca, Be, Sr, Ba and Ra to a hydrophilic solvent at least until the at least one Group II element is at least partially removed so as to produce the nanomaterial that includes the Cu,
 wherein the hydrophilic solvent comprises an aqueous solvent or polyethylene glycol, and
 wherein the hydrophilic solvent is configured to be more reactive with respect to the at least one Group II element than the Cu.

2. The method of claim 1, wherein, prior to the exposing, the at least one Group II element constitutes an atomic fraction of the alloy in a range from about 5% to about 90%.

3. The method of claim 1, wherein the at least one Group II element includes at least the Ca.

4. The method of claim 1, wherein the exposing further exposes the alloy to at least one catalyst, at least one free radical initiator, or a combination thereof.

5. The method of claim 1, wherein the hydrophilic solvent comprises water, alcohol or a mixture thereof.

6. The method of claim 1, wherein the hydrophilic solvent additionally comprises an organic solvent.

7. The method of claim 1, wherein the hydrophilic solvent comprises an organic or inorganic salt.

8. The method of claim 1, wherein the hydrophilic solvent comprises an acid.

9. The method of claim 1, wherein the hydrophilic solvent comprises a surfactant.

10. The method of claim 1, wherein the exposing exposes the hydrophilic solvent to the alloy while the hydrophilic solvent is in the form of a gas, a liquid, or a combination thereof.

11. The method of claim 1,
 wherein the nanomaterial exhibits a set of microstructure characteristics that include the presence of nanopores, nanoflowers, nanoflakes, dendrites, nanowires, nanowhiskers, nanostrips, nanotubes and/or microparticles, microstructures having needle-liked shapes or rod-like shapes, or any combination thereof.

12. The method of claim 1, wherein the alloy is arranged as a powder prior to being exposed to the hydrophilic solvent.

13. The method of claim 1, further comprising:
depositing a coating or shell on a surface of the nanomaterial.

14. The method of claim 1, further comprising:
chemically or electrochemically reducing the nanomaterial to a metallic form.

15. The method of claim 14, further comprising:
depositing a coating or shell on a surface of the nanomaterial to protect against a change in shape or form of the nanomaterial during a chemical or electrochemical reduction process.

* * * * *